(12) United States Patent
Gates

(10) Patent No.: US 6,305,922 B1
(45) Date of Patent: Oct. 23, 2001

(54) SPIRAL FED MULTI-LAYER TUBULAR DIE

(75) Inventor: Peter C. Gates, Ledyard, CT (US)

(73) Assignee: Davis-Standard Corporation, Pawcatuck, CT (US)

( * ) Notice: Subject to any disclaimer, the term of this patent is extended or adjusted under 35 U.S.C. 154(b) by 0 days.

(21) Appl. No.: 08/377,924

(22) Filed: Jan. 25, 1995

Related U.S. Application Data

(63) Continuation of application No. 07/916,372, filed on Jul. 21, 1992, now abandoned, which is a continuation-in-part of application No. 07/792,230, filed on Nov. 14, 1991, now abandoned.

(51) Int. Cl.[7] .................................................. B29C 47/06
(52) U.S. Cl. ..................... 425/133.1; 425/133.5; 425/461; 425/462
(58) Field of Search ............................. 425/131.1, 133.1, 425/133.5, 132, 191, 192 R, 461, 462, 141, 143, 144; 264/171, 173

(56) References Cited

U.S. PATENT DOCUMENTS

| 4,472,129 | * | 9/1984 | Siard | 425/133.1 |
| 4,519,863 | * | 5/1985 | Landgraf et al. | 425/133.1 |
| 4,522,775 | * | 6/1985 | Briggs et al. | 425/133.1 |
| 4,533,308 | * | 8/1985 | Cloeren | 425/131.1 |
| 4,578,025 | * | 3/1986 | Ando et al. | 425/133.1 |
| 4,657,497 | * | 4/1987 | Dehennau et al. | 425/133.1 |
| 4,798,526 | * | 1/1989 | Briggs et al. | 425/133.1 |
| 4,832,589 | * | 5/1989 | Gini et al. | 425/133.1 |
| 4,889,477 | * | 12/1989 | Wortberg et al. | 425/133.1 |
| 5,034,179 | * | 7/1991 | Richter | 425/133.1 |
| 5,069,612 | * | 12/1991 | Teutsch et al. | 425/133.1 |
| 5,393,216 | * | 2/1995 | Teutsch et al. | 425/133.1 |

FOREIGN PATENT DOCUMENTS

| 2038288 | * | 9/1992 | (CA) | 425/133.1 |

* cited by examiner

*Primary Examiner*—Nam Nguyen
(74) *Attorney, Agent, or Firm*—Daniel Reitenbach; Paul Grandinetti

(57) ABSTRACT

An extrusion die apparatus for extruding a multiple layer tubular product comprising an elongated cylindrical mandrel and a plurality of annular die elements mounted co-axially one behind the other on the mandrel forming contiguous annular thickness control passages between the die elements and the mandrel. The die elements have inner and outer conical surfaces inclined rearwardly at a predetermined angle with respect to the longitudinal axis of the mandrel. The die elements are nested together with the outer conical surfaces of one die element facing the inner conical surfaces of an adjacent die element. The inner and outer conical surfaces form conical passages therebetween which communicate with the annular thickness control passages and a helical groove is provided on the outer conical surface of each die element. Means are provided for delivering a molten thermoplastic material to the conical passages wherein the material is substantially uniformly distributed over the outer conical surface containing the helical groove.

17 Claims, 14 Drawing Sheets

Io = ANGLE OF INCLINATION - OUTER CONICAL SURFACE

Ii = ANGLE OF INCLINATION - INNER CONICAL SURFACE

SPIRAL FED MULTI-LAYER TUBULAR DIE

This application is a continuation of prior U.S. application: Ser. No. 07/916,372 filing date Jul. 21, 1992, abandoned and which is a continuation-in-part of application 07/792,230 filed Nov. 14, 1991 and which is abandoned of application.

BACKGROUND OF THE INVENTION

The present invention relates to an improved extrusion die apparatus for co-extruding multiple layers of thermoplastic material into multi-layer tubular products.

In the packaging of many products, particularly foods such as meats, vegetables, fruits, juices and other perishables, sanitary articles and a host of other items, multiple layer plastic containers and films are used wherein at least one of the layers is composed of a polymer which is impermeable to oxygen and/or resistant to infrared rays. Such containers and films are conventionally made by an extrusion-blown process in which the multiple layers are co-extruded from different polymers having the desired characteristics. The multiple layers are co-extruded in a die apparatus employing a number of concentric mandrels forming a series of cylindrical passages therebetween. A molten thermoplastic material is continuously fed to the cylindrical passages forming the individual layers which are then extruded into a multi-layer tube. A problem with this die apparatus, however, is that the thermoplastic material is not always distributed uniformly throughout the passages with the result that the multiple layers are frequently formed with imperfections such as weld lines and the like.

It has been proposed in the prior art to obtain a more homogeneous distribution of the thermoplastic material during the co-extrusion process by modifying the configuration of the concentric die mandrels. One of the more successful attempts has been to incorporate one or more helical or spiral grooves in the outer surface of the mandrels. The groove or grooves gradually decrease in depth as they approach the downstream end of the die apparatus forcing the thermoplastic material to flow out of the grooves and intermix with other portions of the material in the passages. Such proposals are disclosed, for example, in U.S. Pat. Nos. 3,966,861 to Papesh et al; U.S. Pat. No. 4,182,603 to Knittel; U.S. Pat. No. 4,185,954 to Murakami et al; German Pat. No. 2,250,151; and Japanese Pat. Nos. 51-19466 and 56-67223.

It is also known in the art to co-extrude multiple layer tubing using a series of annular die elements coaxially mounted one behind the other along a center core or mandrel. The die elements are formed with conical surfaces defining a series of conical passages, each of which communicates with an annular thickness control passage formed between the die elements and the center core or mandrel. The thermoplastic material is fed to each of the conical passages and enters the annular thickness control passage, overlapping previously formed layers which are then co-extruded as a multiple laminate through an extrusion orifice to form a multi-layer tube. Such multi-layer tubular extrusion die apparatus are disclosed, for example, in U.S. Pat. Nos. 4,047,968 to Kudo et al; U.S. Pat. No. 4,472,129 to Siard; and U.S. Pat. No. 4,522,775 to Briggs et al. These extrusion die apparatus avoid the known disadvantages of using conical mandrels, namely, increased size and complexity of the die apparatus. So far as is presently known, however, die apparatus using a series of annular die elements coaxially mounted along a center core or mandrel as described hereinabove have not employed helical or spiral grooves on the conical surfaces of the die elements for enhancing the uniformity of the extruded, multiple layer tubular product.

SUMMARY OF THE INVENTION

The present invention is directed to an extrusion die apparatus for co-extruding a multiple layer tubular product comprising an elongated cylindrical mandrel having a forward end and a rearward end and a plurality of annular die elements mounted co-axially one behind the other on the mandrel. The annular die elements form contiguous annular thickness control passages between the die elements and the mandrel. The die elements include inner and outer conical surfaces which are inclined rearwardly at predetermined angles with respect to the longitudinal axis of the mandrel. The die elements are nested together along the mandrel with the outer conical surface of one die element facing the inner conical surface of an adjacent die element, the nested die elements forming conical passages therebetween which communicate with the annular thickness control passages formed between the adjacent die elements and the mandrel. The outer conical surface of at least one of the die elements has at least a single helical groove therein and preferably a plurality of helical grooves, each of which extends at least partly around the circumference of the conical surface. Means are provided for delivering molten thermoplastic material to the conical passages formed by the inner and outer conical surfaces of adjacent die elements. The thermoplastic material is substantially uniformly distributed over at least the conical surfaces of the die element provided with the helical groove or grooves and enters the annular thickness control passages between the die elements and the mandrel forming overlapping tubular layers which are then extruded from the die in the form of a multiple layer tube.

In a preferred embodiment of the invention, a molten thermoplastic material is delivered from an inlet to a plurality of outlets on each die element by a binary divider system including a plurality of channels each communicating with a pair of channels whereby the flow of molten thermoplastic material is divided into pairs of separate paths leading to the plurality of outlets.

BRIEF DESCRIPTION OF THE DRAWINGS

In the accompanying drawings.

DESCRIPTION OF A PREFERRED EMBODIMENT

Figure 3:
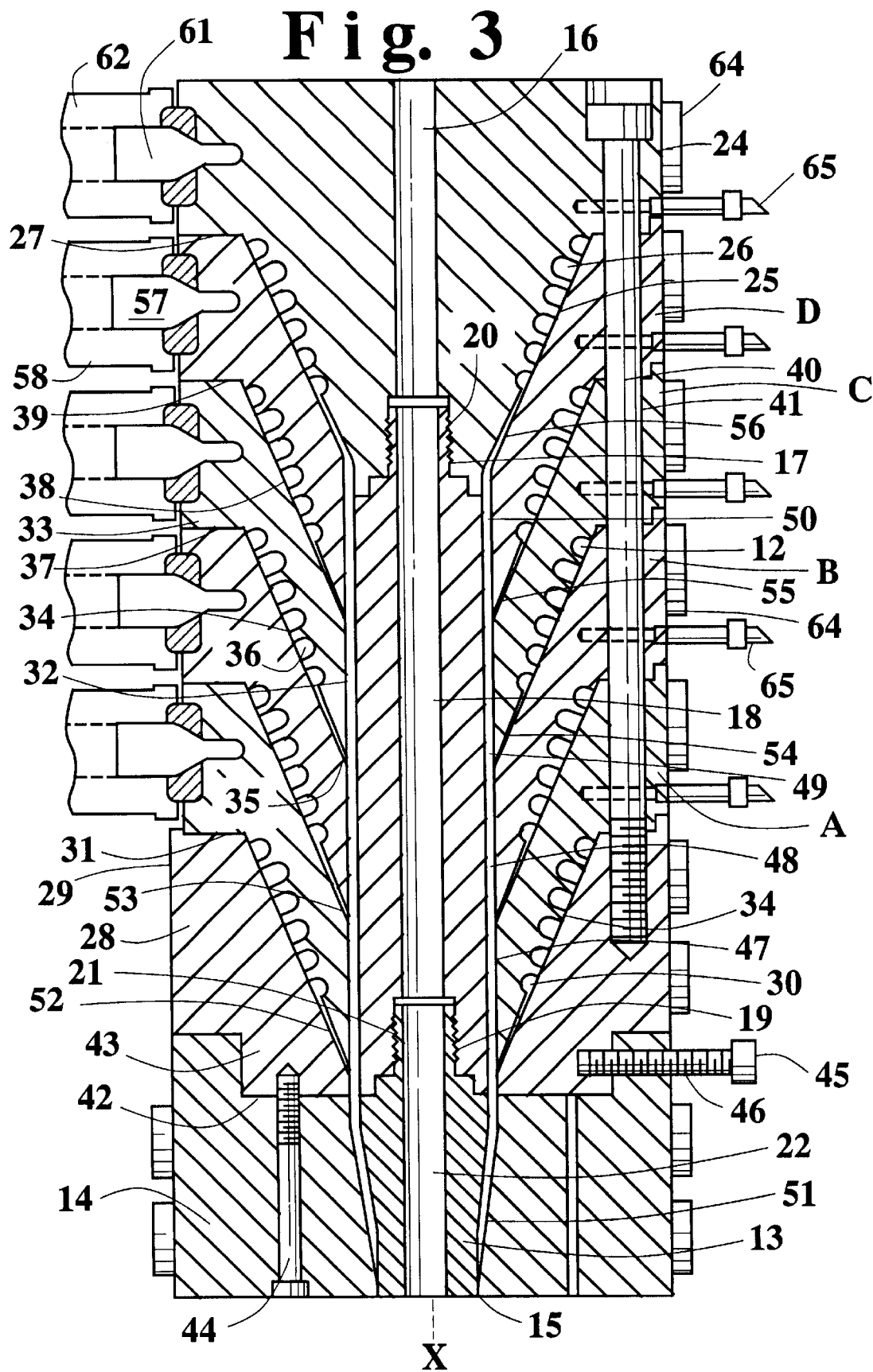
FIG. 3 is an elevational view of an extrusion die apparatus according to the invention.

Referring now to the drawing wherein like reference numerals refer to the same or similar parts throughout the several views, there is shown in FIG. 3 an extrusion die apparatus indicated generally at 10 for co-extruding multiple layers of thermoplastic material to form multiple layer tubular products according to the invention. For purposes of illustration, the extrusion die apparatus 10 is shown in a vertical position as it would be used, for example, in the well known extrusion-blowing process, the direction of flow of the thermoplastic material being from top to bottom or from the rearward end to the forward end of the die apparatus 10. As shown, the extrusion die apparatus 10 comprises a base 11 having an elongated cylindrical core or mandrel 12 mounted to its forward end. A circular inner lip 13 is mounted to the mandrel 12 and is supported inside an annular outer lip 14 at the forward end of the die apparatus. The circular inner lip 13 and the annular outer lip 14 form an annular orifice 15 therebetween for extruding multiple layer tubes.

The base 11 has a center bore 16 which is counter-sunk and threaded at its forward end as shown at 17. Similarly, the mandrel 12 has a center bore 18 which is counter-sunk and threaded at its forward end as shown at 19. The mandrel 12 is provided with a threaded stem 20 at its rearward end which is screwed tightly into the threaded end of the bore 16 joining the mandrel 12 to the base 11. Similarly, the circular inner lip 13 is provided with a threaded stem 21 which is screwed tightly into the threaded forward end of the mandrel 12 joining the inner lip 13 to the mandrel 12. The circular inner lip 13 also has a center bore 22 which along with the bore 16 in the base 11 and the bore 18 in the mandrel 12 are aligned with the center axis x—x of the die apparatus 10. Thus, the center bores 16, 18 and 22 form a continuous passageway through the die apparatus for delivering a substance or element such as pressurized air, water, oil or wire, for example, into the extruded tube as it emerges from the orifice 15.

The base 11 is formed with an outer cylindrical surface 24 and a conical surface 25. The conical surface 25 is inclined outwardly from the forward end of the base 11 and has a single helical groove 26 therein. The base 11 also includes a flat annular surface 27 which extends radially outward from the conical surface 25 and joins the cylindrical surface 24. The flat annular surface 27 provides a seat for locating one of a plurality of annular die elements indicated generally by the reference letters A through D, inclusive, as shall be described in greater detail hereinafter.

An annular spacer 28 is mounted co-axially behind the annular outer lip 14. The spacer 28 has an outer cylindrical surface 29 and an inner conical surface 30. The inner conical surface 30 is inclined outwardly from the forward end of the spacer 28 and is straight and smooth. The spacer 28 also has a flat annular surface 31 at its rearward-end which extends radially outward from the inner conical surface 30 and joins the outer cylindrical surface 29. This flat annular surface 31 similarly provides a seat for locating one of the plurality annular die elements A–D, inclusive.

Figure 1:
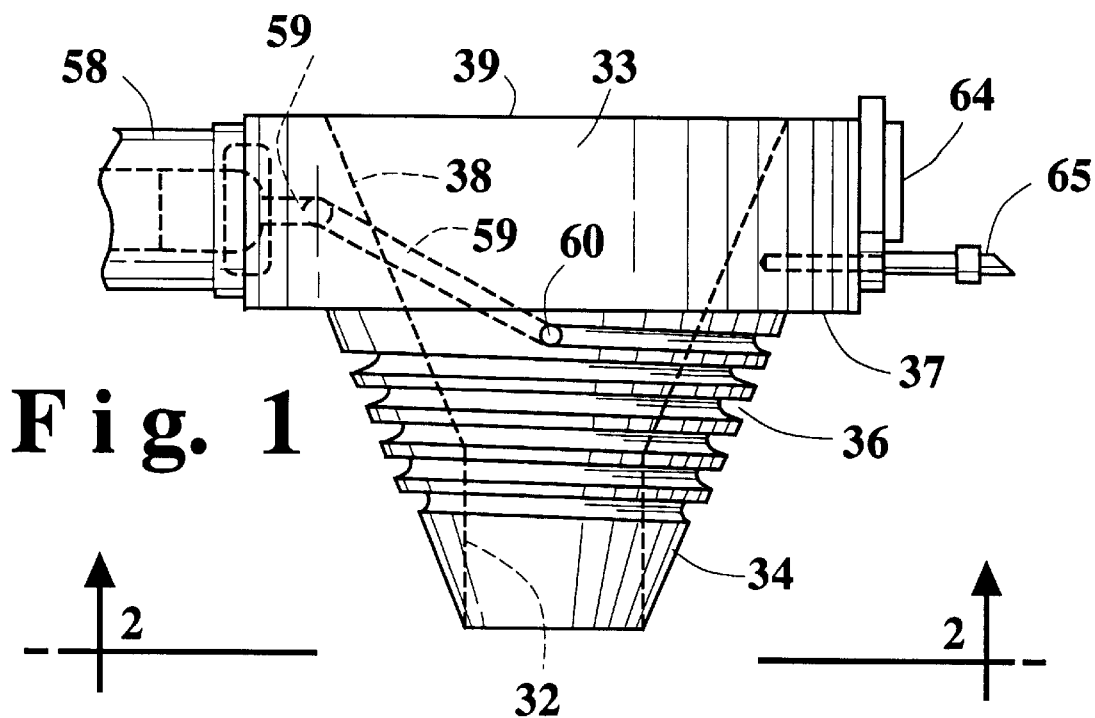
FIG. 1 is a side elevational view of an annular die element for use in an extrusion die apparatus according to the invention.
Figure 2:
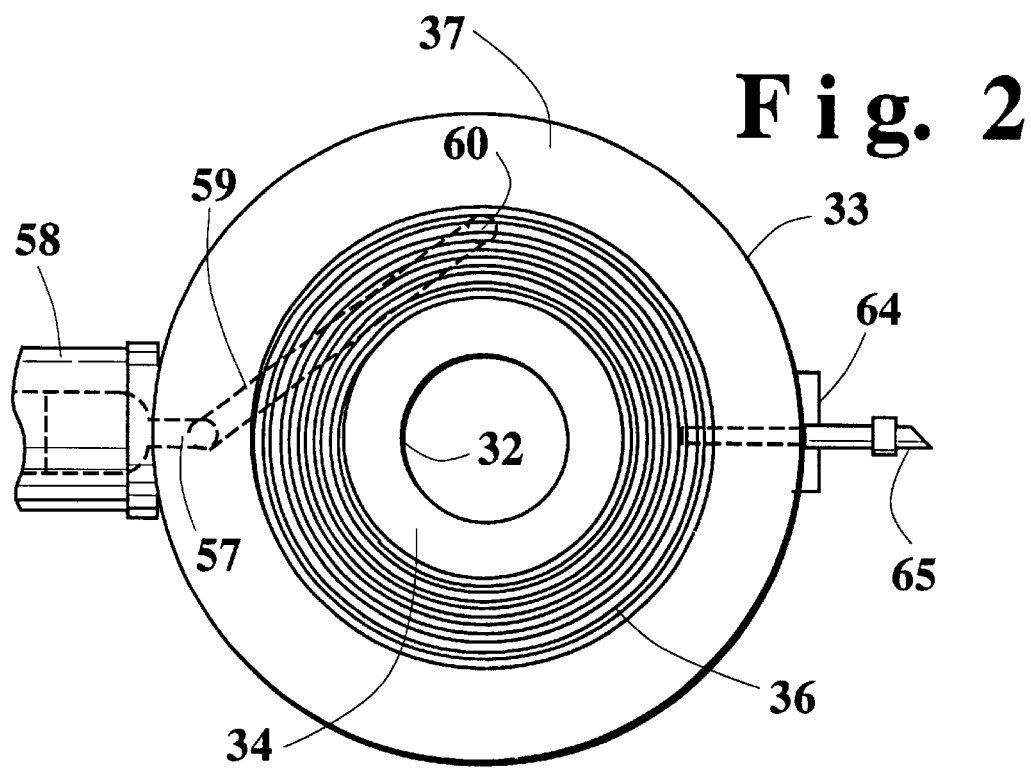
FIG. 2 is a plan view of the die element taken along the lines 2—2 in FIG. 1.
Figure 4:
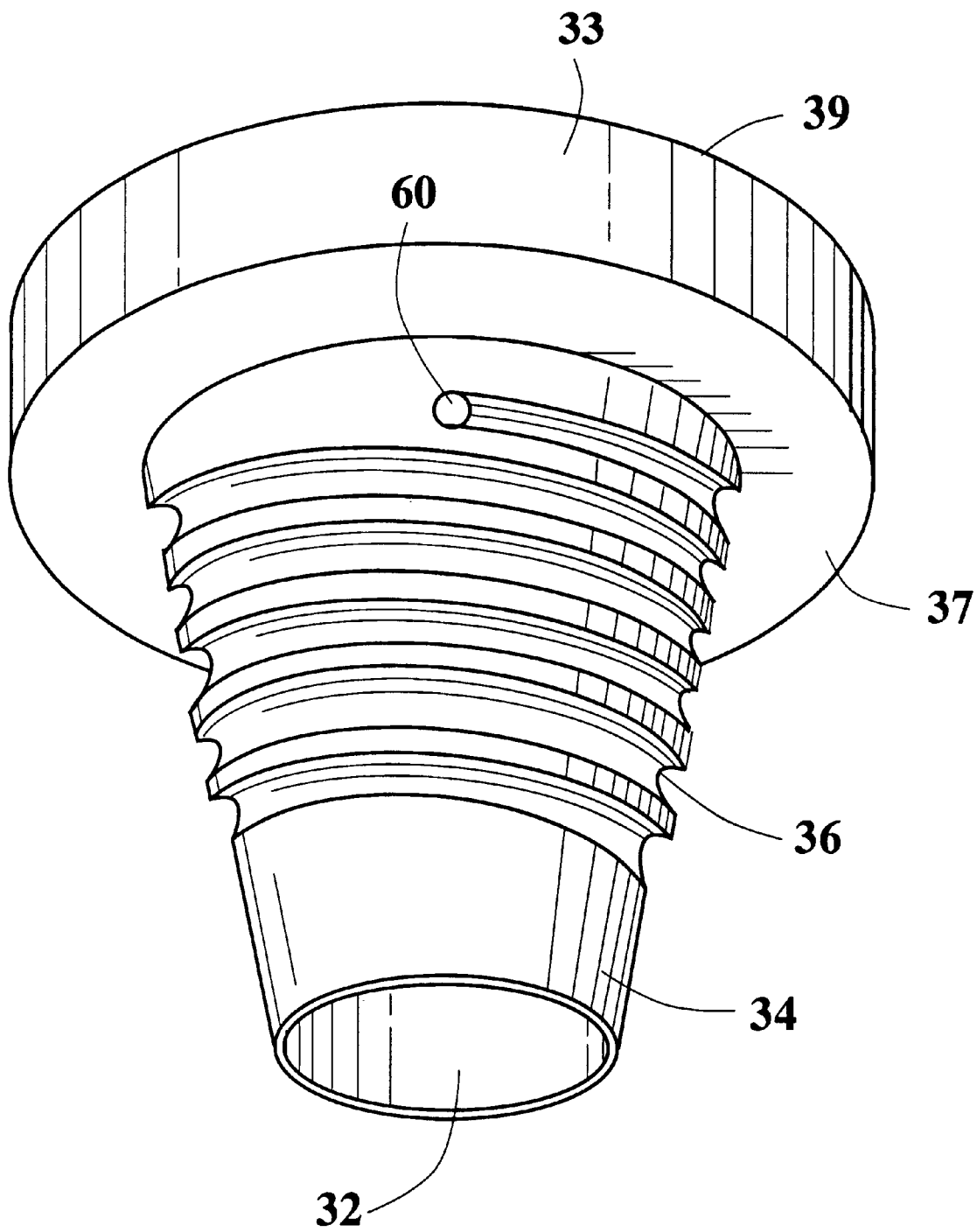
FIG. 4 is a perspective view of one of the annular die elements used in the extrusion die apparatus shown in FIG. 3.

As best shown in FIGS. 1, 2 and 4, the annular die elements A–D, inclusive, are all similar in structure, each including an inner-annular surface 32, an outer cylindrical surface 33 and an outer conical surface 34. The outer conical surface 34 joins the inner annular surface 32 at the forward end of the die element and forms an annular lip 35. The conical surface 34 is inclined outwardly from the annular lip 35 and has a single helical groove 36 therein. The die element also includes a flat annular surface 37 facing toward the forward end of the die apparatus 10 which extends radially outward from the outer conical surface 34 and joins the outer cylindrical surface 33.

Each die element A–D, inclusive, further includes an inner conical surface 38 and a flat annular surface 39 facing toward the rearward end of the die apparatus 10. The inner conical surface 38 joins the inner annular surface 32 at the end opposite the lip 35. The inner conical surface 38 is inclined outwardly in substantially parallel relationship with the outer conical surface 34 and is straight and smooth. The flat annular surface 39 extends radially outward from the inner conical surface 38 and joins the outer cylindrical surface 33.

The inner and outer conical surfaces 38, 34 on each annular die element A–D, inclusive, are inclined at substantially the same predetermined angle with respect to the center axis x—x of the die apparatus 10. The same is also true in the case of the inner conical surface 30 on the annular spacer 28 and the outer conical surface 25 on the base 11. This angle of inclination may vary from one die apparatus to another depending upon the particular application but generally will lie in a range of between about 20 and 80 degrees, for example.

As shown in the assembly view of FIG. 3, the plurality of annular die elements A–D, inclusive, are mounted coaxially along the mandrel 12. The forward end of each die element is nested inside the rearward end of an adjacent die element, except in the case of the first die element A whose forward end is nested inside the rearward end of the annular spacer 28. Similarly, the forward end of the base 11 nests inside the rearward end of the last die element D at the rearward end of the die apparatus 10.

The flat annular surface 37 on each die element A–D, inclusive, facing toward the forward end of the die apparatus 10 abuts or seats against the flat annular surface 39 on an adjacent die element, except in the case of the first die element A whose annular surface 37 abuts or seats against the flat annular surface 31 on the annular spacer 28. Similarly, the flat annular surface 27 on the base 11 abuts or seats against the flat annular surface 39 the last die element D.

The entire assembly is secured together by a series of threaded bolts 40, say about eight to twelve bolts, for example, (only one of which is shown) which extend through aligned openings 41 in the outer sector of each die element adjacent to the cylindrical surface 24. It should also be noted that the rearward end of the annular outer lip 14 has an annular recess 42 centered around its longitudinal axis and further that the forward end of the annular spacer 28 has a reduced diameter annular section or extension 43 which fits snugly into the recess 42. It will be seen by this construction that all of the annular die elements A–D, inclusive, are aligned co-axially with the spacer 28 and the outer lip 14. The outer lip 14 and the spacer 28 are both secured in place suitably by a series of screws 44 (only one of which is shown in the drawing).

An adjustment screw 45 extends through a threaded hole 46 in the side wall of the outer lip 14. This screw 45 makes contact with the annular extension 43 at the forward end of the spacer 28 so as to move the outer lip 14 in one direction or the other with respect to the circular lip 13. Thus, any eccentricity that may develop in the extrusion orifice 15 due to manufacturing tolerances in the nested die elements A–D, respectively, can be readily eliminated.

The co-axially mounted annular die elements A–D, inclusive, form contiguous annular thickness control passages 47–50, respectively, between the inner annular surfaces 32 of each die element and the outer surface of the mandrel 12. The passages 47–50 communicate with the extrusion die orifice 15 through an annular passage 51 defined between circular inner lip 13 and the outer lip 14.

The outer conical surface 34 on the first die element A is so configured with respect to the inner conical surface 30 on the annular spacer 28 as to form a conical passage 52 therebetween. This passage 52 communicates with the passage 51 defined between the circular inner lip 13 and the annular outer lip 14.

In a similar fashion, the outer conical surfaces 34 on the die elements B, C and D, inclusive, are so configured with respect to the inner conical surfaces 38 on the adjacent die elements A, B and C, respectively, as to form three conical passages 53, 54 and 55 therebetween. These passages 53, 54 and 55 communicate with the annular thickness control passages 47, 48 and 49 formed respectively between the die elements A, B and C and the mandrel 12.

Finally, the outer conical surface 25 on the base 11 is so configured with respect to the inner conical surface 38 on the last die element D as to form a conical passage 56 therebetween. This passage 56 communicates with the annular thickness control passage 50 formed between the die element D and the mandrel 12.

Each of the annular die elements A–D, inclusive, has an inlet port 57 located on its outer cylindrical surface 33 which is supplied with molten thermoplastic material from a manifold 58. The port 57 communicates with a channel 59 which is bored through the die element as best shown in FIGS. 1 and 2. The channel 59 leads to an opening 60 which in turn communicates with the beginning end of the helical groove 36 on the outer conical surface 34. The base 11 is also provided with an inlet port 61 and a manifold 62 which communicate in a similar fashion with the groove 26 on the conical surface 25.

It should be noted at this point that the depth of the helical groove 36 on the conical surfaces 34 gradually diminishes toward the downstream end of each conical passage 52–55 with the groove ending a short distance above the lip 35. The same is also true, of course, in the case of the helical groove 26 provided on the conical surface 25 on the base 11. Thermoplastic material is fed from a source (not shown), such as one or more extruders, to the inlet ports 57, 61 via the manifolds 58, 62 and enters each of the conical passages 52–56, inclusive. Some of the material travels downstream in each passage while the remainder flows through the helical grooves eventually being forced out into the conical passages due to the decreasing depth of the grooves. This causes the thermoplastic material to thoroughly intermix and preclude the occurrence of any weld lines in the final product.

The thermoplastic material is then forced out of the conical passages 52–56, past the lips 35 and enters the contiguous thickness control passages 47–50, inclusive, between the die elements and the mandrel 12. It will be noted that the first layer of the multi-layer product emerges from the conical passage 56 between the base 11 and the last die element D, the second layer emerges from the conical passage 55 between the die elements C and D, the third layer emerges from the conical passage 54 between the die elements B and C, the fourth layer emerges from the conical passage 53 between the die elements A and B and the fifth layer emerges from the conical passage 52 between the annular spacer 28 and the die element A.

In one specific example, a five layer tube can be extruded using the die apparatus 10 shown in FIGS. 1–3, the first and fifth layers being ordinary film while the third or intermediate layer is a film that is impermeable to oxygen transmission, the second and fourth layers being an adhesive resin for adhering the three layers together. Each layer overlaps a previously formed layer, except in the case of the first layer, and is laminated thereto as the layers pass through the contiguous thickness control passages formed between the die elements and the mandrel 12. If desired, each of the die elements A–D, inclusive, and the base 11 may be equipped with a separate heating bands 64 around the outer cylindrical surfaces for individually controlling the temperature of the thermoplastic material as it passes through the conical and thickness control passages during the extrusion process. Thermocouples 65 may also be attached to each die element to assure accurate temperatures at each lamination point. The laminated layers of thermoplastic material eventually pass through the annular passage 51 and are extruded as a multi-layer tube from the extrusion orifice 15.

An important feature of the invention is achieved by combining the conical surfaces on the die elements with the helical grooves. Thus, the diameter of the helical grooves decreases along with the depth of the grooves as mentioned hereinabove, resulting in a further restriction in the flow of material through the conical passages. This greatly improves flow distribution, further reduces weld lines and enhances consistency around the tubular structure.

Another important feature of the invention is that the plurality of die elements A–D, inclusive, can be made to a similar structure and configuration such that the individual die elements are all interchangeable and can be arranged in a different order on the mandrel 12. Thus, it is possible to replace one or more of the die elements with other die elements to arrive at any desired arrangement such as B, D, A, E and C, for example.

Figure 4A:
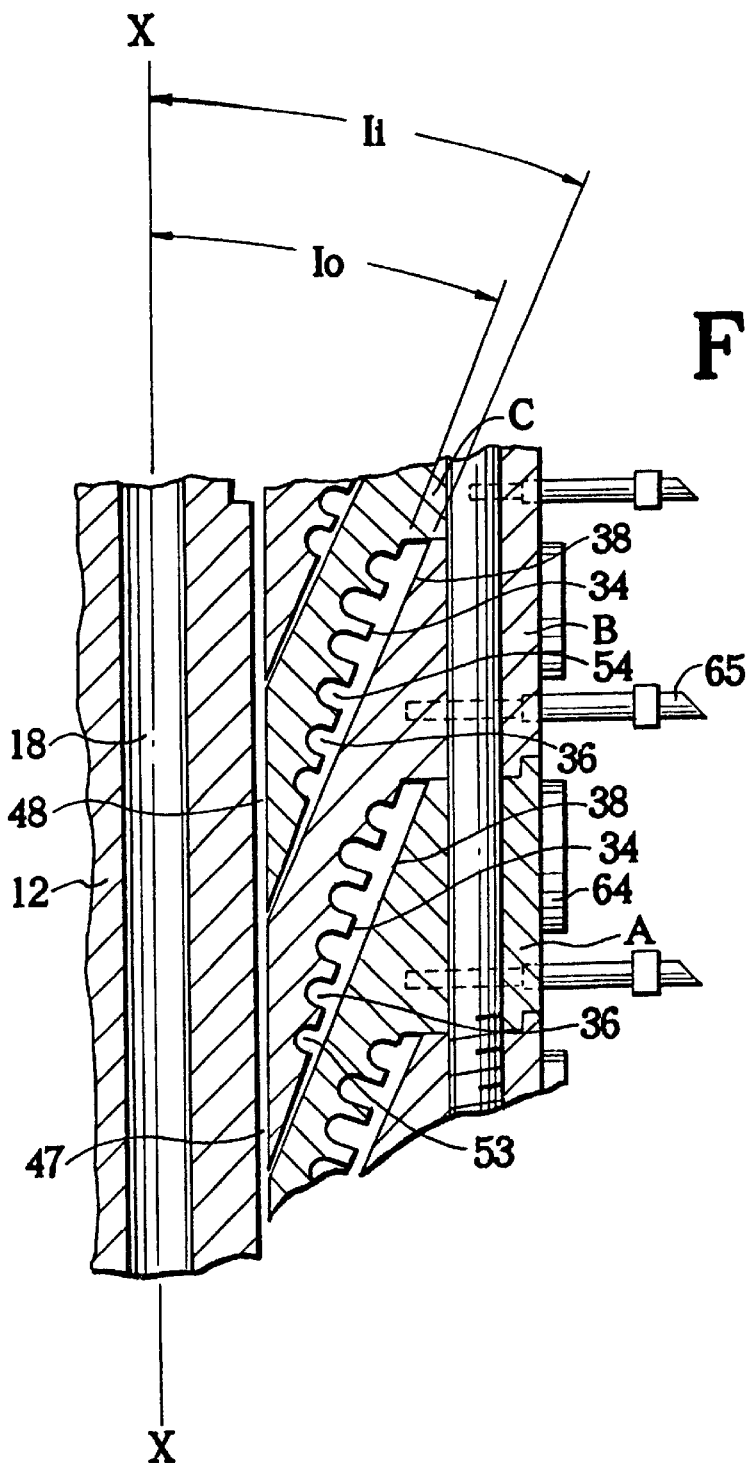
FIG. 4a is a fragmentary sectional view of a part of the die apparatus shown in FIG. 3 illustrating another embodiment of the invention.

It is of course possible to construct the die elements with different characteristic and properties for handling different thermoplastic resins and/or materials. For example, the angle of inclination of the outer conical surface containing the helical groove or grooves may be less than that of the inner conical surface of an adjacent die element in order to vary the width of the conical passage defined therebetween while that for the other die elements remains the same. Such an arrangement is illustrated in FIG. 4*a*. The angle of inclination for the inner conical surface will usually be the same for all the die elements.

A basic feature of the invention is to achieve layer thickness control and layer lamination at the point where the new layer is applied to the previous structure. This is attained by designing the spiral path to perform with the resin specified as explained above and to design the portion of the individual flow path at the laminating point to satisfy the range of thickness expected.

Still another important feature of the invention is that the plurality of die elements are arranged to produce a relatively low residence time, that is, time from entry from the extruder to the lamination point. In addition, the flow path from entry to lamination point is the same or similar for all the layers. The die apparatus of the invention achieves all of this with a minimum number of parts which are easily manufactured and assembled. The die apparatus is also easily disassembled for repair and cleaning.

Figure 5:
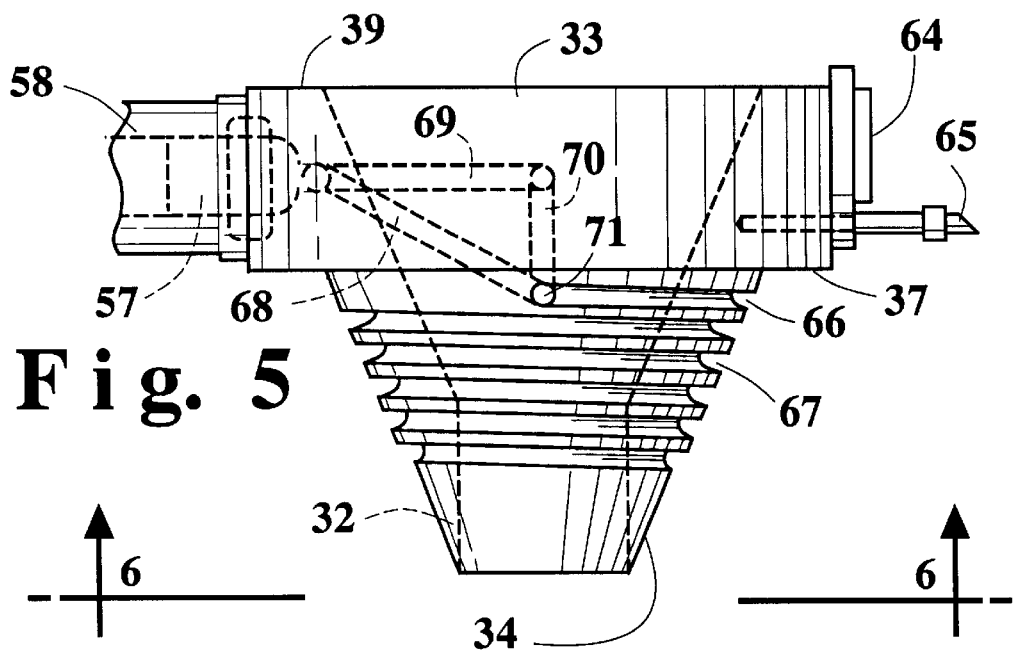
FIG. 5 is a view similar to FIG. 1 showing an annular die element according to another embodiment of the invention.
Figure 6:
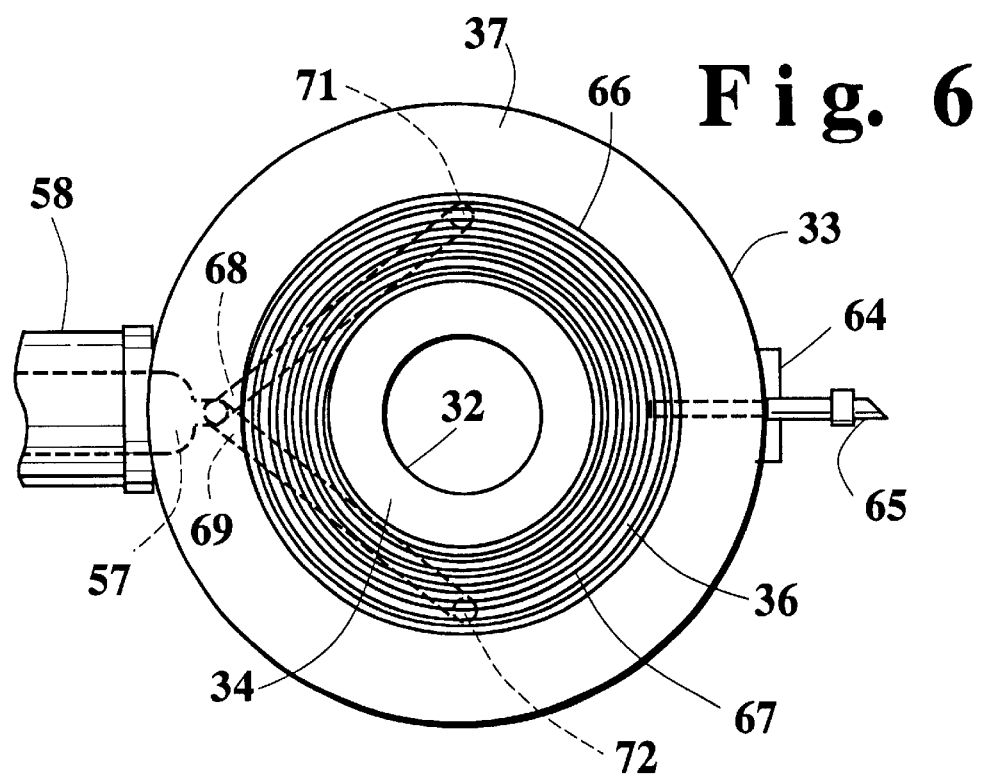
FIG. 6 is a plan view of the die element taken along the line 6—6 in FIG. 5.

FIGS. 5 and 6 show another embodiment of the die apparatus of the invention wherein two helical grooves 66, 67 are provided within the conical surface 34. The two grooves 66, 67 begin at points located about 180 degrees apart on the conical surface 34 and approximately 90 degrees from the inlet port 57. Both grooves 66, 67 are fed with thermoplastic material from the inlet port 57, one via a single channel 68 and the other via two intersecting channels 69, 70. The channel 68 extends from the inlet port 57 to an opening 71 which communicates with the beginning of the groove 66. The other two channels 69, 70 are disposed at right angles to one another and extend from the inlet port 57 to an opening 72 (FIG. 6) communicating with the beginning of the groove 67. This arrangement allows the thermoplastic material to flow freely through the channels and into the grooves 66, 67 without changing direction more than about 90 degrees at any one time. It will be seen, of course, that the use of two grooves 66, 67 assures a greater uniformity in the flow of thermoplastic material through the conical passages 52–56, inclusive.

Figure 7:
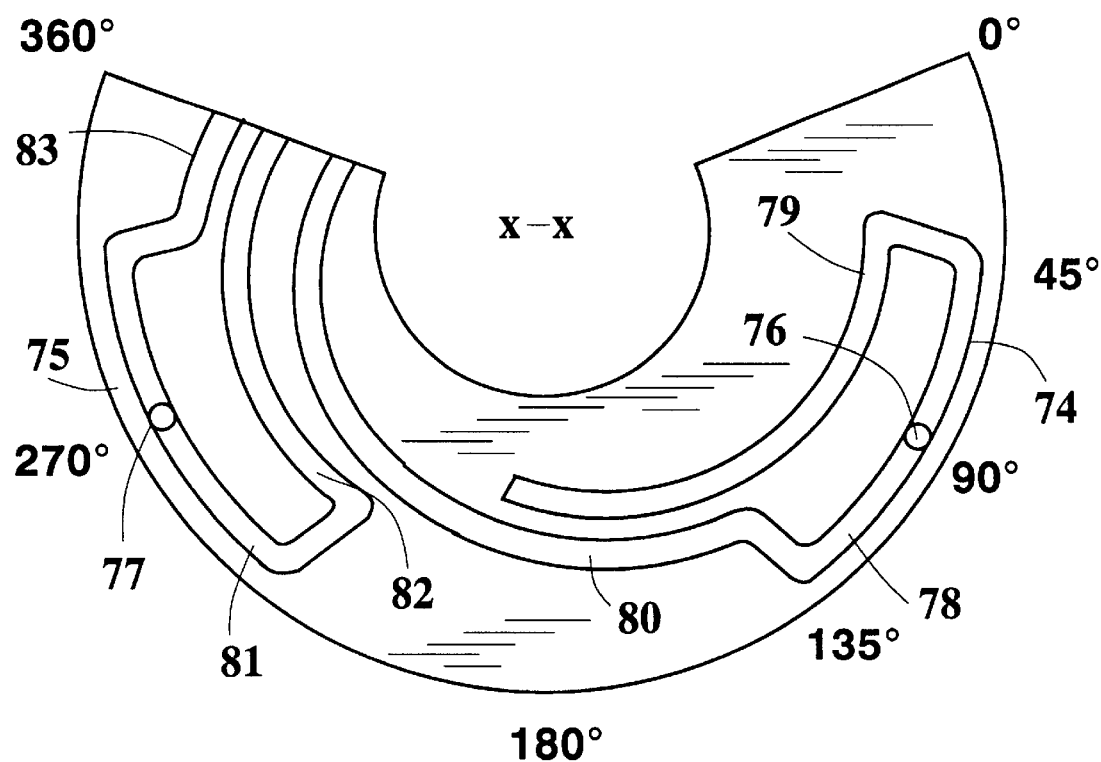
FIG. 7 is a plan view showing a planar projection of the conical surface on a die element according to still another embodiment of the invention.

FIG. 7 shows still another embodiment of the die apparatus of the invention wherein four helical grooves may be provided within the conical surface 34. For purposes of illustration, the conical surface 34 in this view of the drawing is represented as a flat planar surface with radial lines extending outwardly from the center axis x—x at every 45 degrees around its circumference. This arrangement employs two binary divider systems indicated generally by the reference numerals 74, 75.

Each of the binary dividers 74, 75 is fed with thermoplastic material through an opening 76, 77, respectively, provided within the conical surface 34. The first opening 76 is located along the 90 degree radial line while the second opening 77 is located along the 270 degree radial line as shown in FIG. 7. The two openings 76, 77 may be supplied with thermoplastic material by the same channel arrangement as employed in the previous embodiment.

The opening 76 is disposed midway within a groove 78 extending between the 45 degree and 135 degree radial lines in the first binary divider 74. The groove 78 then branches at its opposite ends into two separate helical grooves 79, 80 which extend around the circumference of the conical surface 34.

Similarly, the opening 77 is disposed midway within a groove 81 extending between the 225 degree and 315 degree radial lines in the second binary divider 75. The groove 81 then branches at its opposite ends into two separate grooves 82, 83 which also extend around the circumference of the conical surface 34. It will be understood, of course, that additional binary dividers could be employed to substantially increase the number of helical grooves provided within the conical surface 34 leading to an even greater uniformity in the flow of thermoplastic material through the die apparatus.

FIGS. 8–12 illustrate a multi-layer, binary divider system for uniformly distributing a molten thermoplastic material from an extruder to the conical surface of an extrusion die element according to the invention. The binary divider system illustrated includes four annular distribution rings 84, 85, 86 and 87 placed one on top of the other to form a stacked assembly as generally indicated at 88 in FIG. 8. The rings 84–87, inclusive, form at their respective interfaces one of three layers L, M and N. Each of these layers includes at least one of a series of interconnecting channels which are formed, such as by machining, within the surface of at least one of the adjacent rings 84–87 as shall be described in greater detail hereinafter. Each of the channels divides the flow of thermoplastic material into two separate paths eventually leading, in this case, to eight spaced apart openings P1–P8 located on the outer surface 89 of the fourth or last ring 87 at the top of the stacked assembly.

Figure 9:
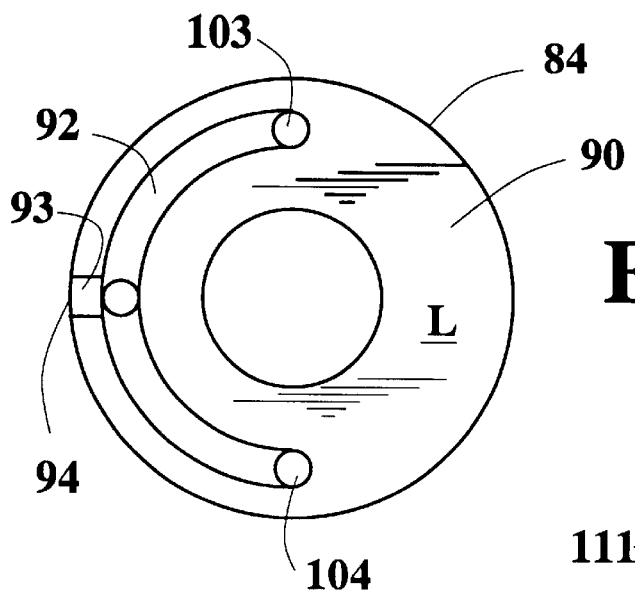
FIG. 9 is a plan view of the distribution ring at the bottom of the stack taken along the lines 9—9 in FIG. 8.

FIG. 9 shows in greater detail the first ring 84 which is located at the bottom of the stacked assembly. The ring 84 has formed within its top surface 90 a single arcuately shaped channel 92. The channel 92 extends through an angle of about 180 degrees around the central axis of the ring. A second channel 93 extends radially inward from an inlet port 94 and communicates with the channel 92 at about its midpoint.

Figure 10:
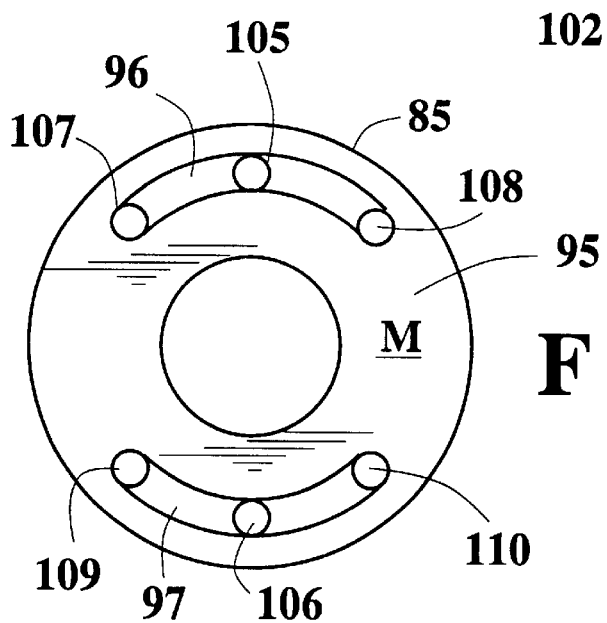
FIG. 10 is a similar view of an adjacent ring in the stack taken along the lines 10—10 in FIG. 8.

FIG. 10 shows the second ring 85 in the stacked assembly forming the binary divider system. The ring 85 has formed within its top surface 95 a pair of arcuately shaped channels 96, 97. The channels 96, 97 are disposed diametrically opposite one another and extend through an angle of about 90 degrees with respect to the central axis of the ring 85.

Figure 11:
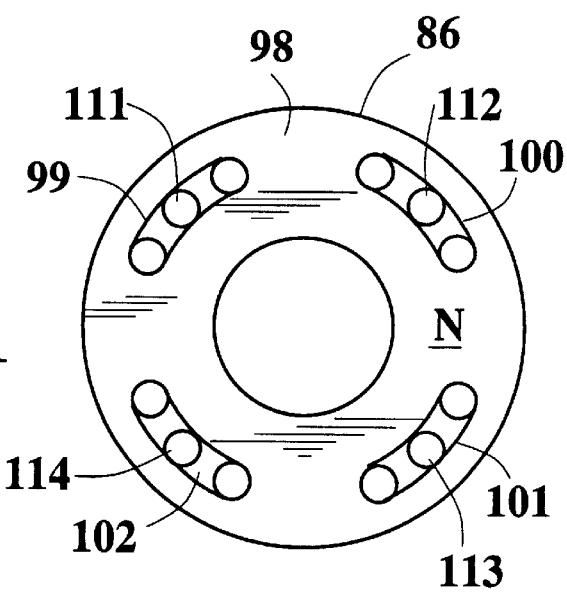
FIG. 11 is a similar view of the next adjacent ring in the stack taken along the lines 11—11 in FIG. 8.

FIG. 11 shows the third distribution ring 86. The ring 86 has formed within its top surface 98 four arcuately shaped channels 99, 100, 101 and 102, respectively. Each of these channels is disposed diametrically opposite to another of the channels and each extends through an angle of about 45 degrees with respect to the central axis of the ring 86.

The first and second distribution rings 84 and 85 are so arranged with respect to one another in the stacked assembly that the pair of channels 96, 97 are offset radially about 90 degrees from the single channel 92 within the first ring 84. The channels 96, 97 communicate at their midpoints with the single channel 92 at its opposite ends 103, 104 via two straight channels 105, 106 which are drilled longitudinally through the second distribution ring 85 (see FIG. 12).

In a similar fashion, the second and third distribution rings 85 and 86 are so arranged with respect to one another in the stacked assembly that the four channels 99–102, inclusive, are offset radially about 45 degrees from the pair of channels 96, 97 within the ring 85. The four channels 99–102 communicate at their midpoints with the pair of channels 96, 97 at their opposite ends 107, 108 and 109, 110, respectively, via four straight channels 111, 112, 113 and 114 which are also drilled longitudinally through the third distribution ring 86.

Figure 12:
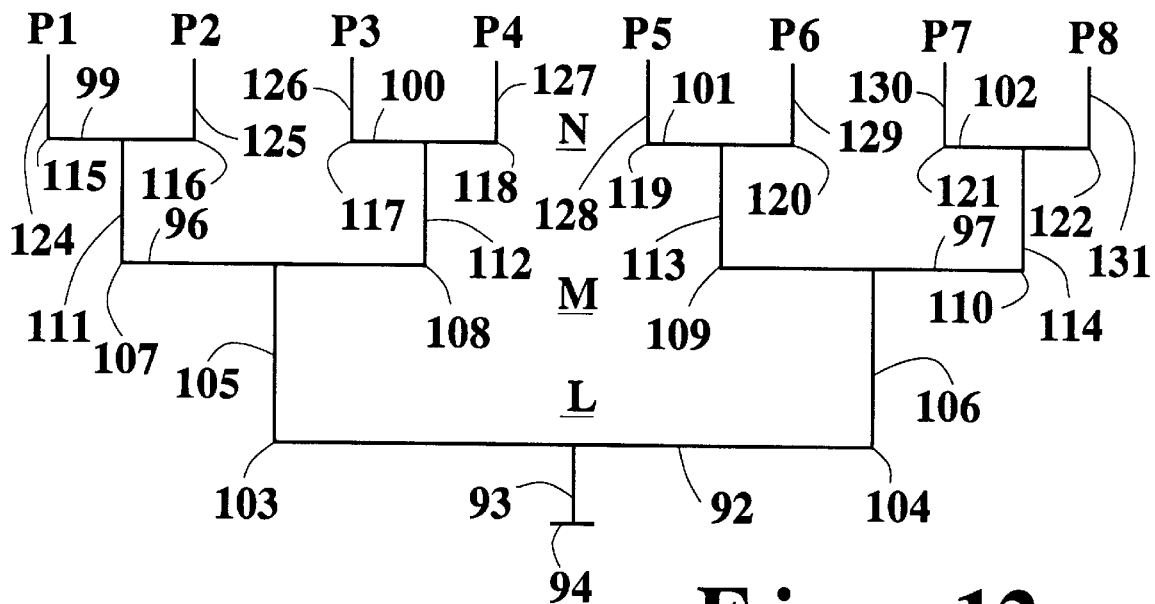
FIG. 12 is a flow diagram illustrating the operation of the multi-layer binary divider system shown in FIGS. 8–11.

The operation of the multi-layer, binary divider system is best understood by reference to the flow diagram shown in FIG. 12. As shown, a molten thermoplastic material from an extruder (not shown) is fed to the inlet port 94. The molten thermoplastic material enters the single arcuately shaped channel 92 in the layer L via the entrance channel 93 and then branches outwardly in two different directions toward the opposite ends 103, 104 of the channel 92. The molten material is then directed upwardly from the first layer L to the second layer M via the two longitudinal channels 105, 106. The molten thermoplastic material then enters the pair of arcuately shaped channels 96, 97 in the layer M and branches outwardly in two different directions toward the opposite ends 107, 108 and 109, 110 of the pair of channels 96, 97. The molten material is then directed from the layer M to the layer N via the four longitudinal channels 111–114. The molten material enters the four arcuately shaped channels 99–102, inclusive, and branches outwardly in two different directions toward the opposite ends 115, 116; 117, 118; 119, 120; and 121, 122 of the four channels 99–102, respectively, entering eight longitudinal channels 124–131 which communicate respectively with each of the multiplicity of exit ports P1–P8. Each port P1–P8 communicates in turn with one of a plurality of helical grooves, in this case, eight grooves, on the conical surface of a die element.

Figure 13:
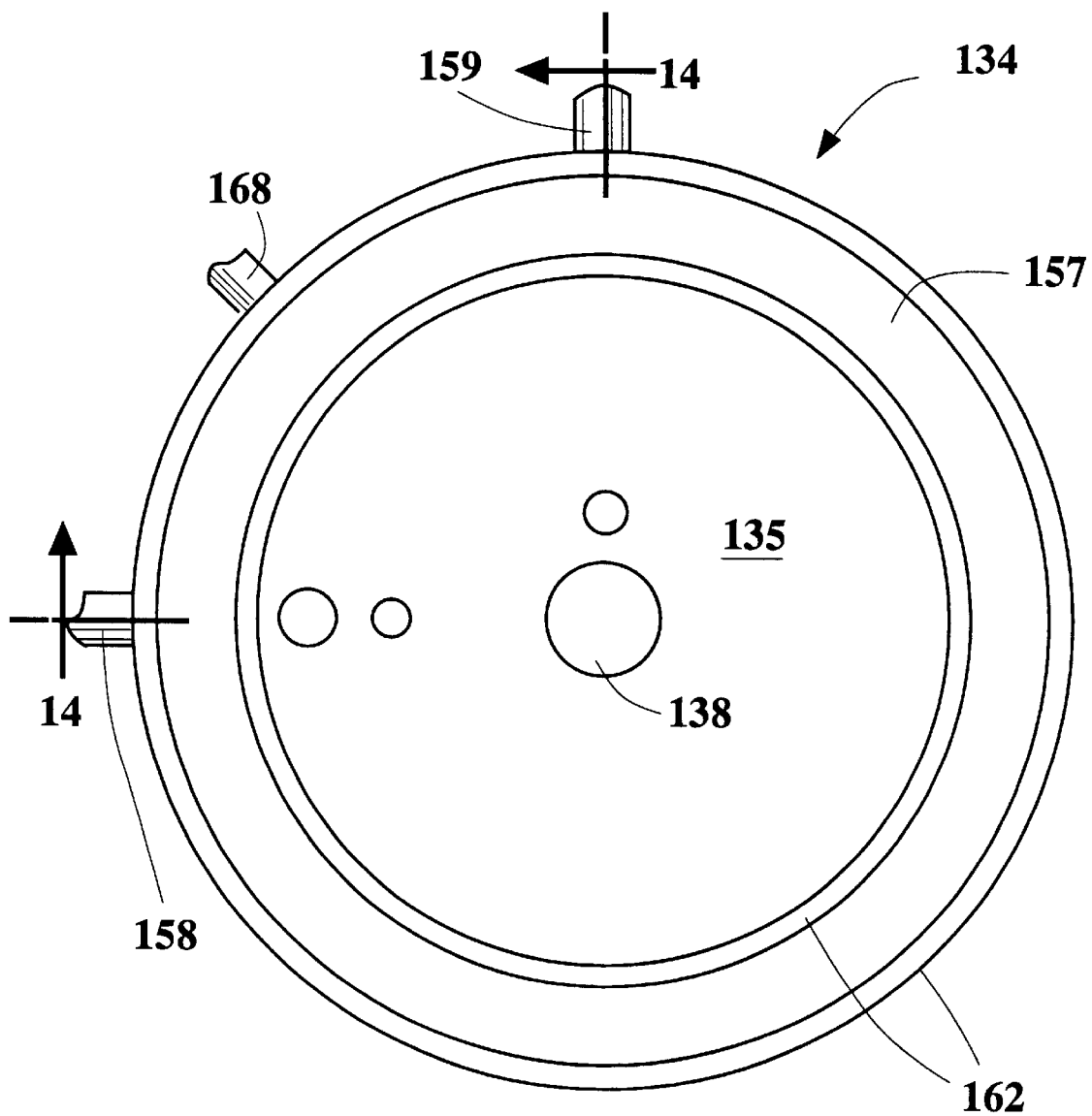
FIG. 13 is a plan view of an extrusion die apparatus incorporating a multi-layer binary divider system according to a preferred embodiment of the invention.
Figure 14:
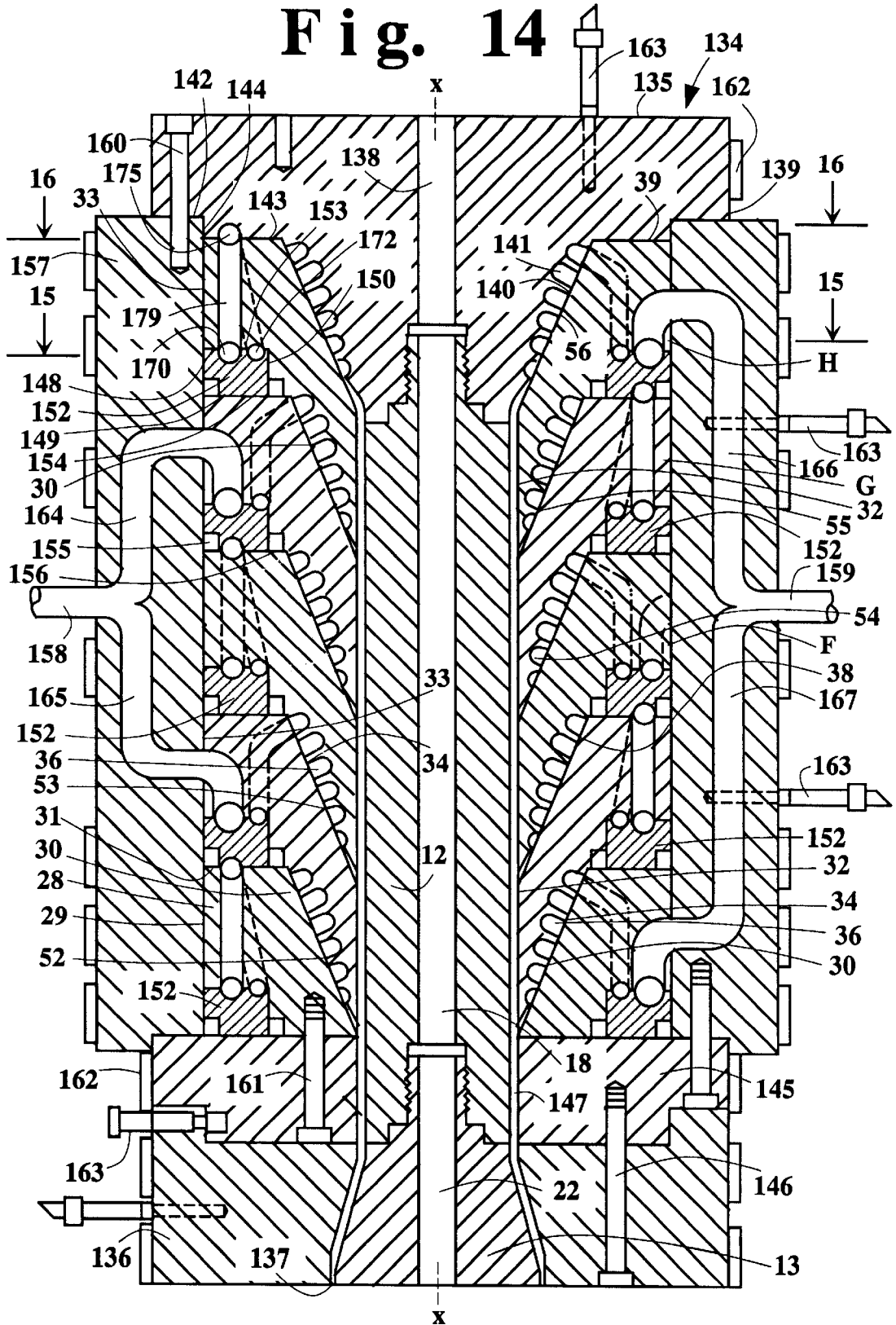
FIG. 14 is an elevational, cross-sectional view of the extrusion die apparatus taken along the lines 14—14 in FIG. 13.

Referring now to FIGS. 13 and 14, there is shown an extrusion die apparatus, indicated generally at 134, employing a multi-layer binary divider system according to a preferred embodiment of the invention. The extrusion die apparatus 134 is basically the same as the die apparatus 10 described hereinabove and shown in FIG. 3, utilizing many of the same or similar parts in its construction, which parts will be hereinafter identified by the same reference numerals for the sake of simplicity. As shown, the die apparatus 134 includes an elongated cylindrical core or mandrel 12 mounted at one end to a cylindrical base 135 and carrying at its opposite or forward end a circular inner lip 13. The inner lip 13 is similarly supported inside an annular outer lip 136 forming therebetween an annular extrusion orifice 137.

The mandrel 12, circular inner lip 13 and the base 135 are joined together using the same threaded stem arrangement employed in the die apparatus 10. The base 135 is similarly provided with a center bore 138 which is aligned with the center bore 18 of the mandrel 12 and the center bore 22 of the inner lip 13. As in the die apparatus 10, this arrangement forms a continuous passageway along the center axis x—x for delivering pressurized air, water, oil, wire, etc., into the extruded tube as it emerges from the extrusion orifice 137.

The base 135 is larger in diameter than the base 11 employed in the die apparatus 10 but has the same configuration, including an outer cylindrical surface 139 and a conical surface 140. The conical surface 140 is inclined outwardly from the forward end of the base 135 and has a plurality of helical grooves as at 141.

The base 135 further includes a outer flat annular surface 142 which extends radially inward from the outer cylindrical surface 139 and an inner flat annular surface 143. The surface 143 extends radially outward from the conical surface 140 and joins the outer annular surface 142 forming an annular recess 144. The inner flat annular surface 143 provides a seat for locating one of a plurality of annular die elements E through H, inclusive, as shall be hereinafter described.

At the forward end of the die apparatus 134, the annular outer lip 136 is mounted co-axially to an annular extension ring 145 via a series of elongated bolts 146, only one of which is shown in the drawing. The extension ring 145 surrounds the core or mandrel 12 and has an inner diameter which is greater than the outer diameter of the core or mandrel 12, forming an annular passageway 147 which communicates with the extrusion orifice 137.

Mounted coaxially behind the extension ring 145 is an annular spacer 28. This annular spacer 28 is essentially the same as that employed in the die apparatus 10 (FIG. 3) having the same outer cylindrical surface 29, inner conical surface 30 and the same flat annular surface 31. This surface 31 similarly provides a seat for locating one of the plurality of annular die elements E–H, inclusive.

The annular die elements E–H, inclusive, are also essentially the same as those employed in the die apparatus 10, each including an inner annular surface 32, an outer cylindrical surface 33 and an outer conical surface 34. The outer conical surface 34 also has a plurality of helical grooves, for example, eight grooves, as at 36.

Each of the die elements E–H, inclusive, includes an inner conical surface 38 and the same flat annular surface 39 facing toward the rearward end of the die apparatus 134. The inner conical surface 38 is again inclined outwardly in substantially parallel relationship with the outer conical surface 34 and is straight and smooth. The inner and outer conical surfaces 38, 34 on each die element are also inclined at substantially the same predetermined angle with respect to the center axis x—x. The same is also true, of course, in the case of the inner conical surface 30 on the annular spacer 28 and the outer conical surface 140 on the base 135.

The die elements E–H, inclusive, according to this preferred embodiment of the binary divider system, further include a flat annular surface 148 which faces toward the forward end of the die apparatus 134. This flat annular surface 148 is similar to the flat annular surface 37 on the die elements A–D shown in FIG. 3, but in this case the annular surface 148 is disposed a short distance back from the outer conical surface 30. The flat annular surface 148 together with the inner cylindrical surface 149 form an annular recess 150 around the outer circumference of each die element facing toward the forward end of the die apparatus 134.

The annular die elements E–H, inclusive, are similarly mounted coaxially along the mandrel 12 with the forward end of each die element being nested inside the rearward end of an adjacent die element, except in the case of the first die element E whose forward end is nested inside the rearward end of the annular spacer 28. Similarly, the forward end of the base 135 is nested inside the rearward end of the last die element H at the rearward end of the die apparatus 134.

A multi-layer binary divider system according to the invention is incorporated in the die apparatus 134 by inserting at least a single annular distribution ring of the type described hereinabove inside the space provided by the annular recess 150 on each die element E–H, inclusive, as shown in FIG. 14. In the case of the multi-layer binary divider system described hereinabove and shown in FIGS. 8–12, the entire stack of rings 84–87 may be assembled inside the annular space 150 on each of the die elements E–H, inclusive, as the die elements are nested together along the core or mandrel 12. Each of the exit ports P1–P8 (see FIG. 8) then communicates with one of the plurality of helical grooves 36 on the conical surface 30 of the die element via conduit means (not shown) if required.

In the preferred embodiment of the multi-layer binary divider system shown in FIG. 14, a single distribution ring 152 is inserted in the space provided by the annular recess 150 on each of the die elements E–H, inclusive. The distributor ring 152 has a flat annular rear surface 153 and a flat annular forward surface 154. The flat annular surface 153 abuts tightly against the flat annular surface 148 on each die element while the flat annular surface 154 abuts tightly against the flat annular surface 39 on an adjacent die element, except in the case of the first die element E wherein the flat surface 154 abuts or seats against the back side of the extension ring 145. Each distribution ring 152 is sealed around its inner and outer periphery by a pair of seal rings 155 and 156.

An annular manifold 157 is positioned around the nested assembly of die elements E–H, inclusive, and has a pair of inlet conduits 158, 159 spaced apart about 90 degrees from one another (see FIG. 13) at about the mid-section of the die apparatus 134. The inlet conduits 158, 159 are each connected to an extruder and feed a molten thermoplastic material to four of the five conical passages defined between the die elements E–H, base 135 and annular spacer 28 via the multi-layer binary divider systems according to the invention.

The rearward end of the manifold 157 is secured in place against the annular recess 144 on the base 135 via a series of bolts 160 while the forward end of the manifold is secured in place against the back side of the extension ring 145 via a series of bolts 161, only one of each series of bolts 160, 161 being shown in the drawing.

A plurality of heating bands 162 surround the outer cylindrical surface of the manifold 157 to maintain the molten thermoplastic material at the proper temperature. Heating bands 162 may also be provided around the base 135 and the extension ring 145 for the same purpose. Thermocouples 163 monitor the temperature of the manifold 157, base 135 and the outer lip 136.

The inlet conduit 158 branches into a pair of conduits 164 and 165. The conduit 164 extends rearwardly through the manifold 157 and feeds molten thermoplastic material to the binary divider system servicing the conical passage 55 defined between the adjacent die elements G and H. The conduit 165 extends in the forward direction through the manifold 157 and feeds molten thermoplastic material to the binary divider system servicing the conical passage 53 defined between the adjacent die elements E and F.

The inlet conduit 159 also branches into a pair of conduits 166 and 167. The conduit 166 extends rearwardly through the manifold 157 and feeds molten thermoplastic material to the binary divider system servicing the conical passage 56 defined between the base 135 and the die element H. The conduit 167 extends in the forward direction through the manifold 157 and feeds molten thermoplastic material to the binary divider system servicing the conical passage 52 defined between the annular spacer 28 and the die element E.

As shown in FIG. 13, a third inlet conduit 168 is provided on the outer surface of the manifold 157. This inlet conduit 168 feeds molten thermoplastic material to the binary divider system servicing the conical passage 54 defined between the adjacent die elements F and G in the middle of the assembly.

It should be understood, of course, that various other means may be employed to deliver the molten thermoplastic material from an extruder to each one of the conical passages 52–56 in the die element assembly. For example, the molten thermoplastic material may be fed through the outer side wall of each die element via separate nozzles as shown in FIG. 3.

Figure 8:
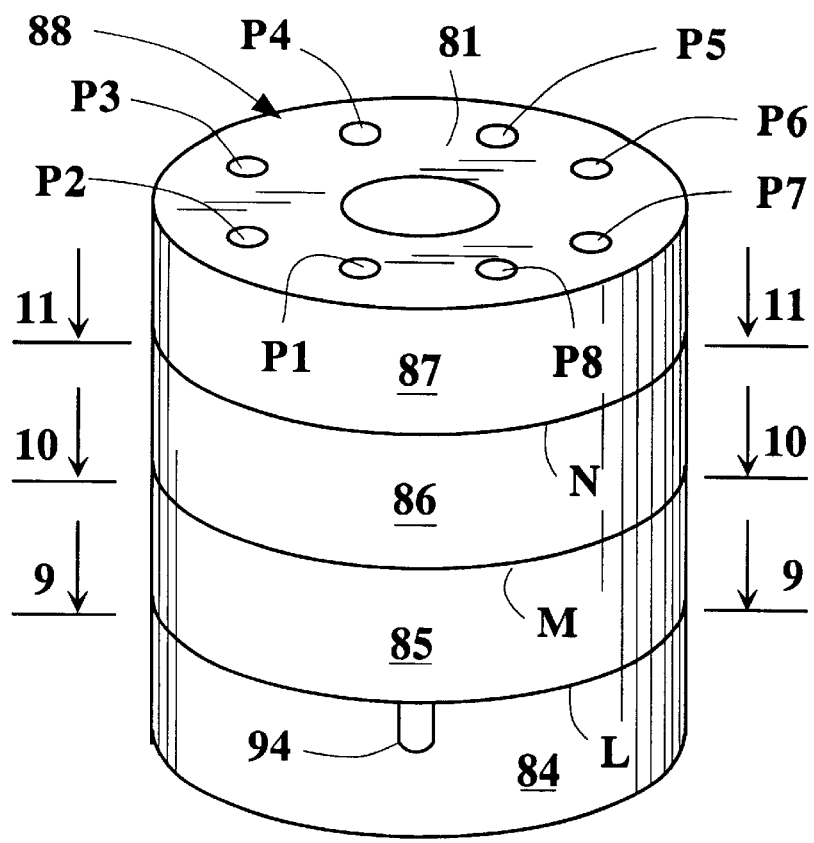
FIG. 8 is a perspective view of a series of stacked, distribution rings incorporating a multi-layer binary divider system for uniformly distributing a molten thermoplastic material to the conical surface of an annular die element according to still another embodiment of the invention.

Turning now to FIGS. 15–20, inclusive, there is shown in greater detail the assembly of one of the multi-layer binary divider systems employed in the extrusion die apparatus 134. The multi-layer binary divider system depicted in these figures of the drawing is the system which services the conical passage 56 defined between the base 135 and the annular die element H, it being understood that the assembly and operation are essentially the same for each one of the multi-layer binary divider systems employed in the die apparatus 134. The multi-layer binary divider system of this preferred embodiment employs only a single distribution ring 152 as opposed to the previously described binary divider system which employs four separate distribution rings 84–87 as shown in FIG. 8.

Figure 15:
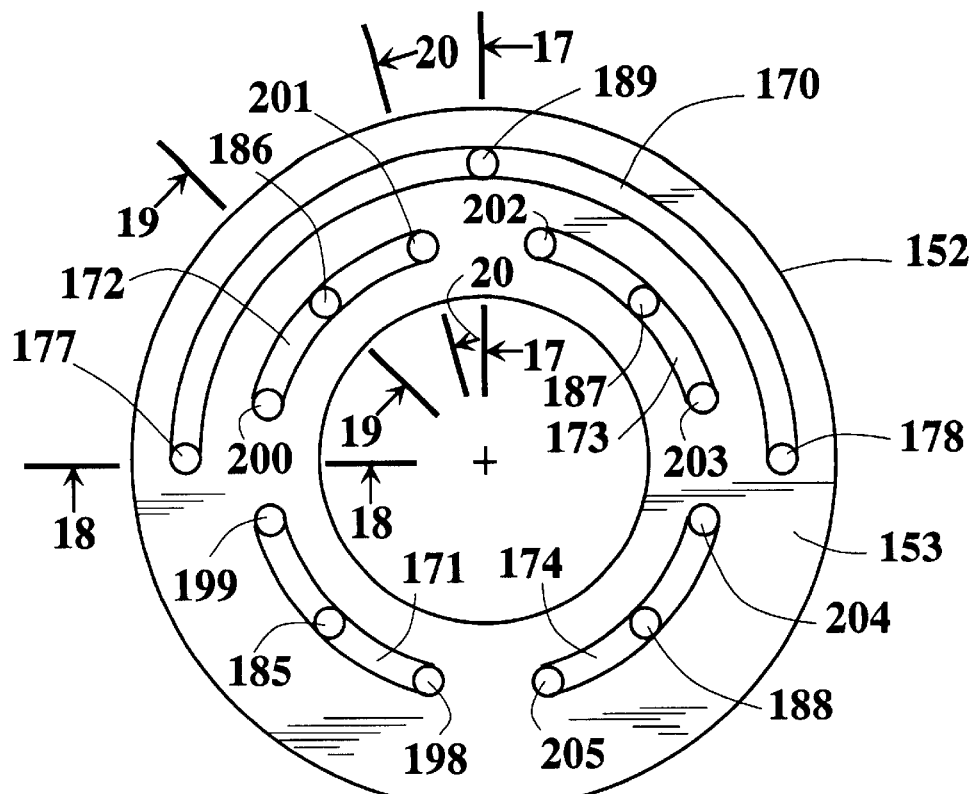
FIG. 15 is a plan view showing the surface of a distribution ring used in the extrusion die apparatus shown in FIGS. 13 and 14.

FIG. 15 shows in greater detail the structure of the distribution ring 152 disposed inside the annular recess 150 on the die element H. It will be seen that the ring 152 has formed within its flat rear surface 153 a half cross-section of a single, outer, arcuately shaped channel 170 which extends through an angle of about 180 degrees around the central axis of the ring. The ring 152 also has formed within the surface 153 the half cross-sections of four inner arcuately channels 171, 172, 173 and 174. These four inner channels are equally spaced apart along a circular path of lesser diameter than the arcuate channel 170 and extends through an angle of about 45 degrees also with respect to the central axis of the ring. The other half cross-sections of the outer channel 170 and the four inner channels 171–174 are formed as a mirror image within the flat annular surface 148 on the die element H. This arrangement allows for the arcuately shaped channels to be easily produced by machining the abutting surfaces of both the distribution rings and the die elements.

Figure 16:
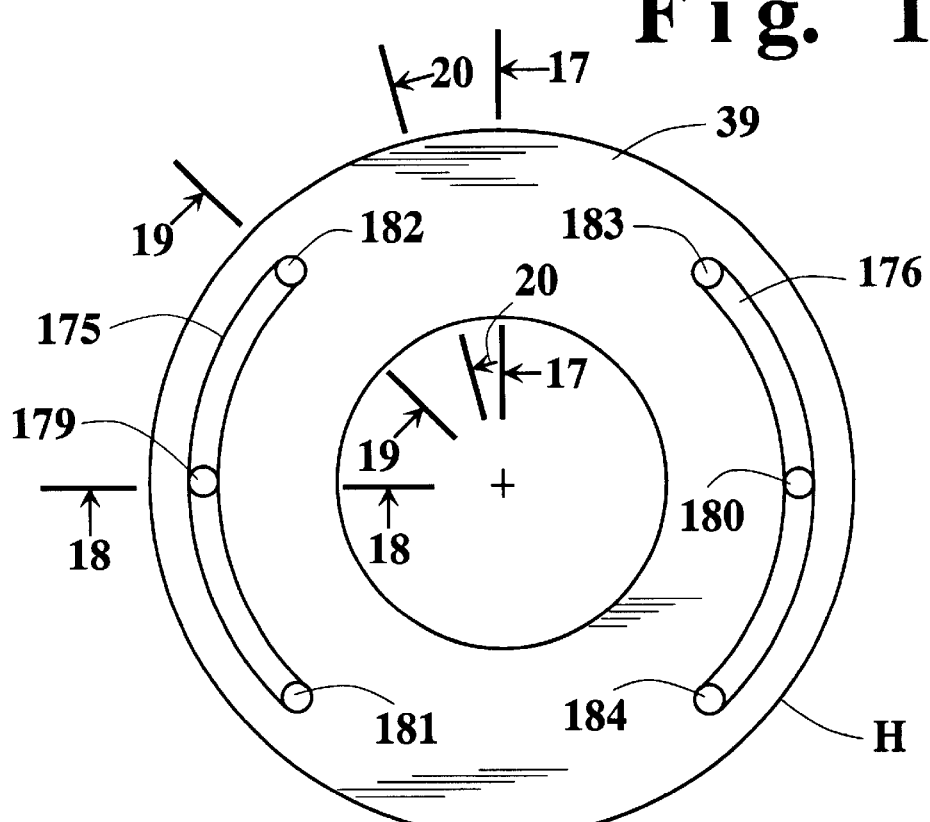
FIG. 16 is a similar view of a portion of the surface on the annular base member used in the extrusion die apparatus of FIGS. 13 and 14.

FIG. 16 shows in detail the flat annular surface 39 on the die element H which also forms a part of the multi-layer binary divider system according to the preferred embodiment of the invention. The surface 39 has formed therein the half cross-sections of two arcuately shaped channels 175, 176. The two channels 175, 176 are disposed diametrically opposite one another and extend through an angle of about 90 degrees with respect to the central axis of the die element H. The other half cross-sections of the two channels 175, 176 are formed as a mirror image within the inner flat surface 143 of the base 135 as shown in FIG. 14. It should be noted that the other half cross sections of the channels 175,176 in the other binary divider system servicing the conical passages 52–55 are formed as mirror images within the flat annular forward surface 154 of an adjacent distribution ring 152.

Figure 18:
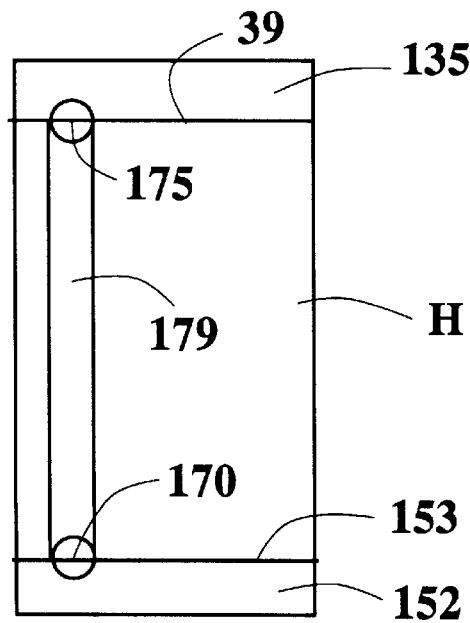
FIG. 18 is a similar view taken along the lines 18—18 in FIGS. 15 and 16.
Figure 20:
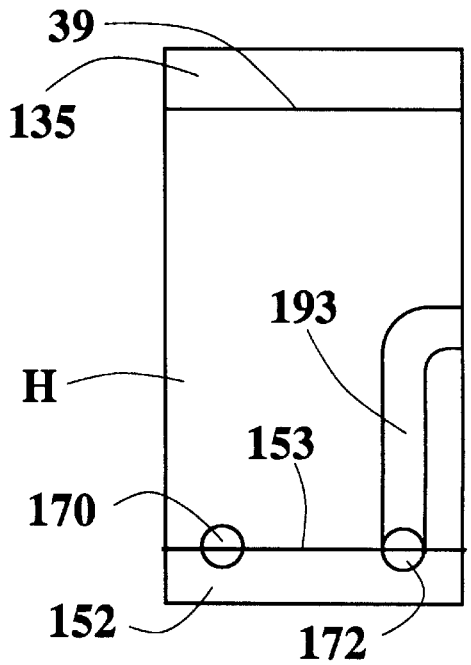
FIG. 20 is a similar view taken along the lines 20—20 in FIGS. 15 and 16.

The distribution ring 152 is so arranged with respect to the die element H that the two channels 175, 176 are offset radially about 90 degrees from the single channel 170 on the flat rear surface 153. The two channels 175, 176 communicate at about their midpoints with the opposite ends 177, 178 of the single channel 170. via two straight channels 179, 180 (see FIG. 21). The channels 179, 180 are drilled longitudinally through the outermost portion of the die element H as best shown in FIGS. 14 and 18.

The four inner channels 171–174 are similarly arranged so that they are offset radially about 45 degrees from the two channels 175, 176 as shown in FIGS. 15 and 16. The four channels 171-174 communicate at about their midpoints with the opposite ends 181, 182 and 183, 184 of the two channels 175, 176 via four straight channels 185, 186, 187 and 188, respectively, (see FIG. 21). These straight channels are drilled at a slight angle through the outermost portion of the die element H as more clearly shown in FIG. 19.

Figure 17:
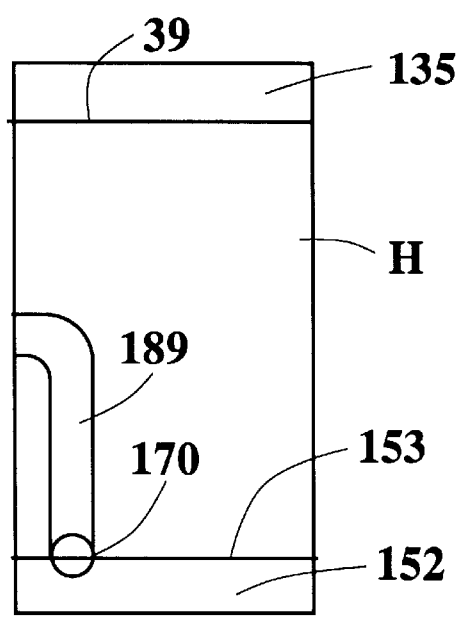
FIG. 17 is a fragmentary, sectional view of an annular die element used in the extrusion die apparatus taken along the lines 17—17 in FIGS. 15 and 16.
Figure 19:
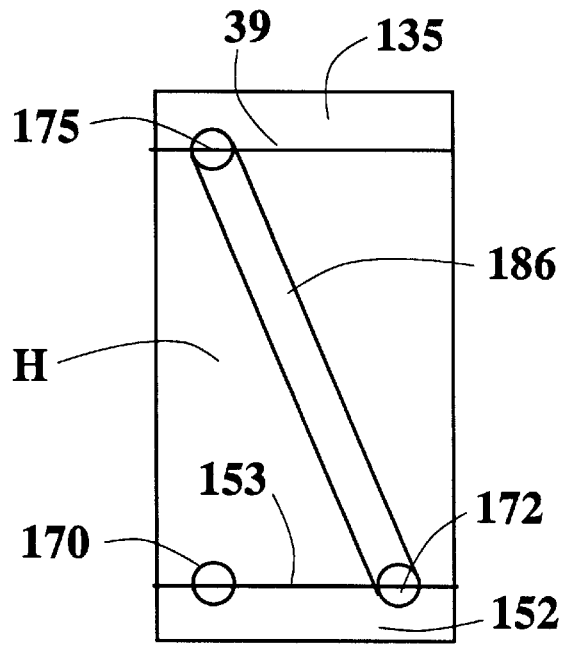
FIG. 19 is a similar view taken along the lines 19—19 in FIGS. 15 and 16.

As shown in FIGS. 14 and 17, molten thermoplastic material enters the binary divider system by way of an entrance channel 189. (FIG. 17) This channel 189 communicates, in this case, with the branch conduit 166 in the manifold 157. The molten thermoplastic material exits the binary divider system by way of eight equally spaced apart feed channels 190–197 which extend rearwardly from the opposite ends 198–205 of the four channels 171–174, respectively. (see FIG. 21) These feed channels similarly lead to eight separate exit ports P1–P8. Each exit port P1–P8 communicates with one of the plurality of grooves 141 on the conical surface 140 of the base 135.

Figure 21:
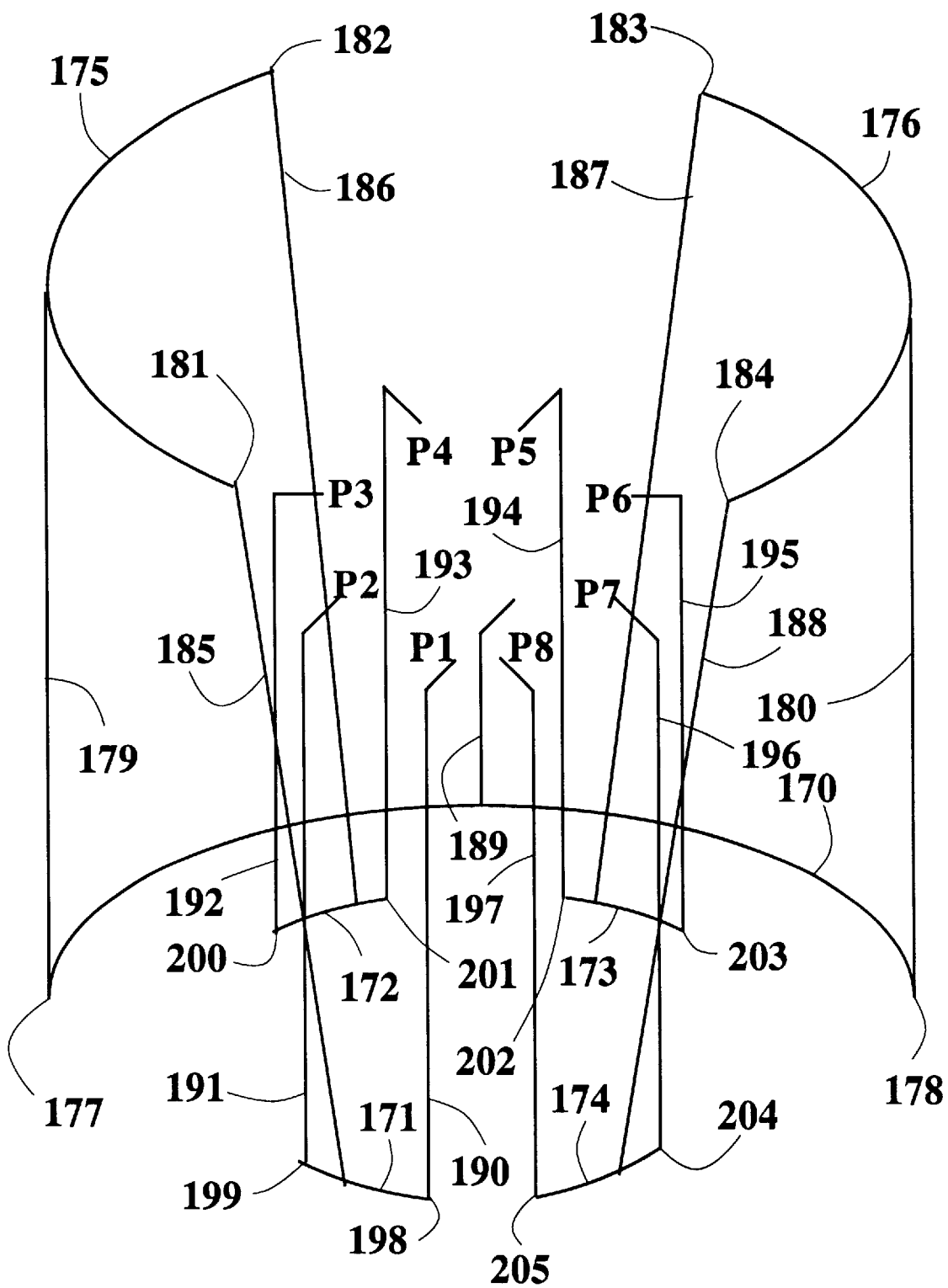
FIG. 21 is an isometric diagram illustrating the operation of the multi-layer binary divider system used in the extrusion die apparatus shown in FIGS. 13–20.

The operation of the multi-layer, binary divider system according to the preferred embodiment of the invention is best understood by reference to the diagram shown in FIG. 21. As shown, a molten thermoplastic material is fed from an extruder (not shown) to the inlet conduit 159. The molten thermoplastic material enters the single arcuately shaped channel 170 via the channel 189 and then branches outwardly in two different directions toward its opposite ends 177, 178. (see FIG. 15) The molten thermoplastic material is then directed rearwardly via the two straight longitudinal channels 179, 180 and enters each one of the pair of arcuately shaped channels 175, 176 at about their midpoints. The molten material then branches outwardly again in two different directions toward the opposite ends 181, 182 and 183, 184 of the pair of channels 175, 176. (see FIG. 16) The molten thermoplastic material is then directed forwardly and inwardly at a slight angle through the four straight channels 185, 186, 187 and 188, entering each one of the four arcuately shaped, inner channels 171, 172, 173 and 174, respectively. The molten material again branches outwardly in two different directions toward the opposite ends 198–205 of the four channels 171–174, respectively. The molten material is again directed rearwardly through the eight feed channels 190–197 and out of the binary divider system via the eight ports P1–P8. The molten material is then fed to the plurality of grooves 36 and is uniformly distributed over the conical surface 30 of the die element.

It will be noted at this point that the binary divider system just described divides the flow of molten thermoplastic material into eight separate ports P1–P8 using only a single distribution ring and two layers containing the interconnecting channels as opposed to the previously described binary divider system using four rings and four layers. The preferred system requires less space and reduces the overall size of the die apparatus. Moreover, this preferred system reduces residence time, improves uniformity of distribution throughout the conical passages and, in general, is more efficient in operation.

Figure 22:
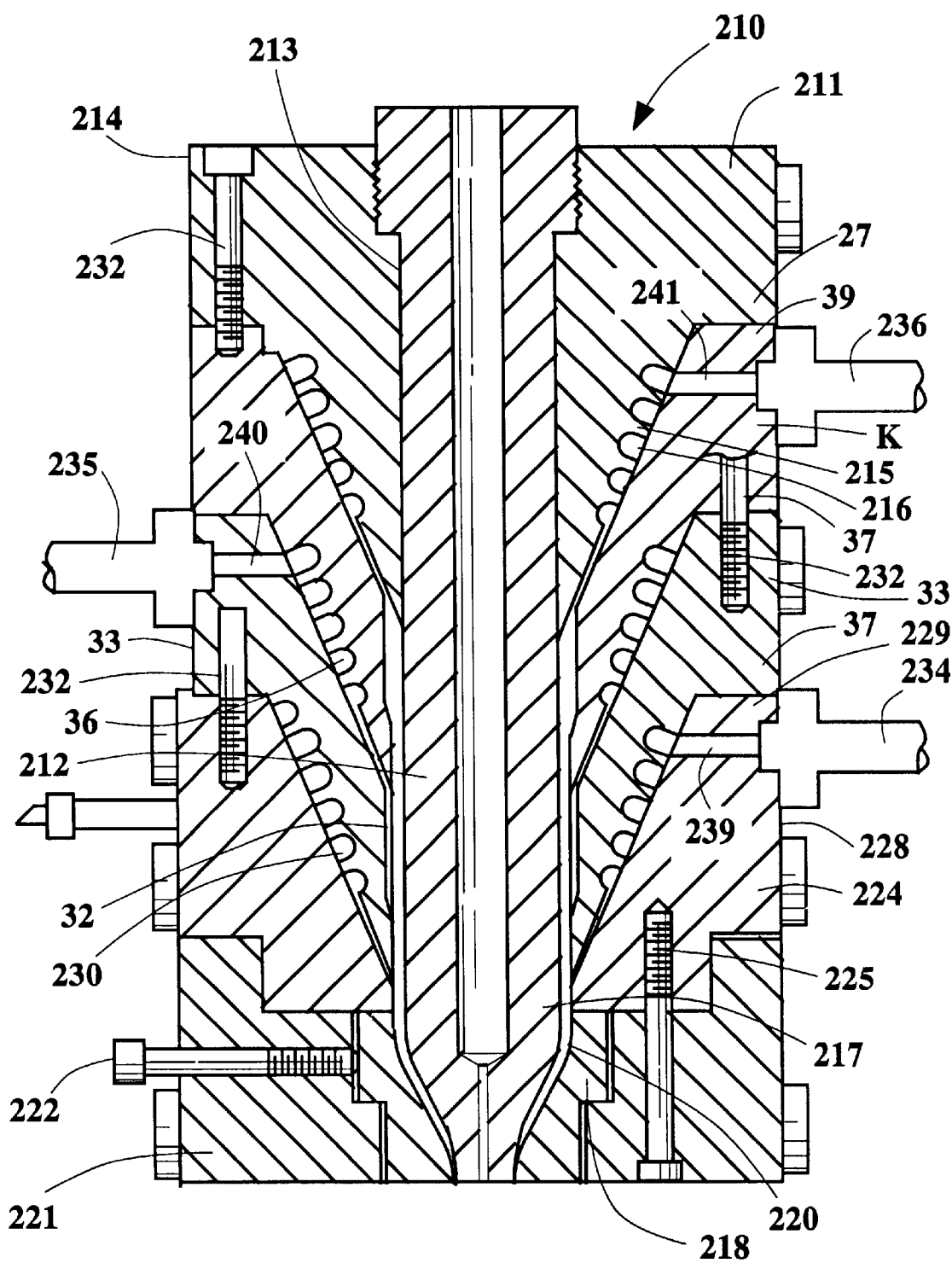
FIG. 22 is an elevational, cross-sectional view of an extrusion die apparatus according to yet another embodiment of the invention.

FIG. 22 shows still another embodiment of an extrusion die apparatus according to the invention. The die apparatus which is designated generally at 210 includes a cylindrical base 211 and a center core or mandrel 212. The base 211 has a center bore 213, an outer cylindrical surface 214 and an outer conical surface 215. The surface 215 has at least a single helical groove 216 therein.

The core or mandrel 212 is threadably engaged at its rearward end inside the center bore 213 of the base 211 and extends outwardly toward the forward end of the die apparatus 210. The core or mandrel 212 is tapered inwardly at its forward end to form an inner lip 217. An outer annular lip 218 surrounds the inner lip 217 and has an inner surface which is shaped to complement the inner lip 217 and to provide an extrusion passageway 220 therebetween.

The outer lip 218 is mounted within the center of an annular support ring 221. The position of the outer lip 218 with respect to the inner lip 217 can be adjusted by turning a bolt 222 which extends through the side wall of the support ring 221.

The annular spacer 224 is coaxially mounted around the forward end of the core or mandrel 212 and is secured in place behind the support ring 221 by a series of bolts 225, only one of which is shown in the drawing.

The annular spacer 224 has an outer cylindrical surface 228, a flat annular surface 229 which extends radially inward from the outer surface 228 and an inner conical surface 230 which is straight and smooth. The flat annular surface 229 provides a seat for locating the first of two conical die elements J and K.

The annular die elements J and K are essentially the same as the die elements A–D employed in the die apparatus 10 (FIG. 3), including the same inner annular surface 32, outer cylindrical surface 33, inner conical surface 38 and outer conical surface 34 having at least a single helical groove 36 therein. The die elements J and K also include the same flat annular surfaces 37 and 39 facing towards the forward and rearward ends, respectively, of the die apparatus 210.

The first conical die element J is mounted coaxially around the core or mandrel 212 with its forward end nested inside the rearward end of the annular spacer 224. Similarly, the second die element K is coaxially mounted around the core or mandrel 12 with its forward end nested inside the rearward end of the first die element J.

The flat annular surface 37 on the first die element J abuts or seats against the flat annular surface 229 on the annular spacer 224 while the flat annular surface 37 on the second die element J abuts or seats against the flat annular surface 39 on the adjacent die element J. Similarly, the flat annular surface 27 on the base 211 abuts or seats against the flat annular surface 39 on the second die element K.

The entire assembly is secured together by a series of threaded bolts 232, say about eight to twelve bolts, for example, which in this case do not pass longitudinally through all of the annular die elements. Rather, the bolts 232 are staggered around the circumference of the die elements J and K so that the bolts 232 which secure the first die element J to the annular spacer 224 are not in alignment with the bolts 232 which secure the second die element K to the first die element J. This arrangement is advantageous in that it permits separate nozzles 234, 235 and 236 to be mounted directly through the side walls of the annular spacer 224 and the two annular die elements J and K. The nozzles feed molten thermoplastic material directly to the inner conical surfaces 238 on the annular spacer 224 and inner conical surface 38 on each of the two die elements J and K via conduit means 239, 240 and 241, respectively. The molten material enters the conical passages and flows uniformly over the conical surfaces 34 and helical grooves 36 on the die elements J and K as well as the conical surface 215 and helical groove 216 on the base 211.

It will be realized, of course, that the extrusion die apparatus of the invention can be orientated and used in many positions depending upon the particular application. For example, the die apparatus 10 can be positioned with its exit end facing downwardly as shown in the accompanying drawing for water quench bath applications, e.g., extruding heavy wall tubing and double bubble extrusion. Conversely, the die apparatus 10 can be positioned horizontally for wire coating, tubing and pipe applications or vertically upward for blown film applications.

What is claimed is:

1. An extrusion die apparatus for extruding a multiple layer tubular product comprising, in combination: an elongated cylindrical mandrel having a forward and a rearward end; a plurality of annular die elements mounted co-axially one behind the other on said mandrel and forming contiguous annular thickness control passages between said die elements and said mandrel, said die elements including inner and outer conical surfaces inclined rearwardly along the longitudinal axis of said mandrel and forming acute angles therewith, said die elements being nested together with said outer conical surfaces facing said inner conical surfaces and forming conical passages therebetween communicating with said annular thickness control passages, said inner conical surface of each of said die elements being inclined at substantially the same acute angle with respect to said longitudinal axis of said mandrel and said outer conical surface of each of said die elements being inclined at an acute angle with respect to said longitudinal axis which is less than that of said inner conical surface of an adjacent die element, said outer conical surface of said die elements having a helical groove therein, the depth of said helical groove decreasing as said groove approaches said annular thickness control passages, and means for delivering a molten thermoplastic material to said conical passages, wherein said material is substantially uniformly distributed over said conical surfaces, entering said annular thickness control passages to form overlapping tubular layers, said overlapping tubular layers being extruded from the in the form of a multiple layer tube.

2. An extrusion die apparatus according to claim 1, wherein said inner conical surface is inclined at an angle of from about 20 and to about 80 degrees with respect to the longitudinal axis of said mandrel.

3. An extrusion die apparatus according to claim 1, further including a base having a forward end and an outer conical surface which is inclined rearwardly from said forward end at a predetermined angle with respect to the longitudinal axis of said base, said base being attached to said mandrel at said forward end with its outer conical surface facing said inner conical surface of one of said adjacent die elements forming a conical passage therebetween which communicates with said annular thickness control passages, said outer conical surface of said base having at least one helical groove therein.

4. An extrusion die apparatus according to claim 3, further including a circular inner lip attached to the forward end of said mandrel and an annular outer lip, said inner lip being supported by said mandrel within said outer lip forming therebetween an annular extrusion orifice, said extrusion orifice communicating with said annular thickness control passages.

5. An extrusion die apparatus according to claim 4, further including means for adjusting the location of said inner lip with- respect to said outer lip.

6. An extrusion die apparatus according to claim 4, further including an annular spacer member co-axially mounted around said mandrel between said annular outer lip and one of said adjacent annular die elements, said spacer member having an inner conical surface which is inclined rearwardly at a predetermined angle with respect to the longitudinal axis of said mandrel, said inner conical surface of said spacer member facing said outer conical surface of said one of said adjacent die elements forming a conical passage therebetween which communicates with said annular thickness control passages.

7. An extrusion die apparatus according to claim 6, wherein each of said annular die elements includes an outer cylindrical portion located behind said outer conical surface, said outer cylindrical portion having a larger diameter than said outer conical surface forming substantially flat annular forward and rearward surfaces extending radially outward from said outer conical surface, said die elements being stacked one behind the other in the nested assembly of said die elements with said substantially flat annular forward surface of one die element mating with said substantially flat annular rearward surface of an adjacent die element.

8. An extrusion die apparatus according to claim 7, wherein said delivery means includes an inlet port located within said outer cylindrical portion of each of said die elements and at least one channel communicating between said inlet port and said helical groove on said outer conical surface.

9. An extrusion die apparatus according to claim 8, wherein said conical surface of each of said die elements includes two or more helical grooves and wherein said delivery means includes at least two channels communicating between said inlet port and said grooves.

10. An extrusion die apparatus according to claim 9, wherein said channels communicate with said grooves via a binary divider.

11. An extrusion die apparatus according to claim 9, further including a heating element for each of said die elements.

12. An extrusion die apparatus according to claim 11, further including a thermocouple for each of said die elements.

13. In an extrusion die apparatus for extruding a multiple layer tubular product including an elongated cylindrical mandrel having a forward and a rearward end; a plurality of annular die elements mounted co-axially one behind the other on said mandrel and forming contiguous annular thickness control passages between said die elements and said mandrel, said die elements including inner and outer conical surfaces inclined rearwardly along the longitudinal axis of said mandrel at acute angles thereto, said die elements being nested together with said outer conical surfaces facing said inner conical surfaces and forming conical passages therebetween communicating with said annular thickness control passages, and means for delivering a molten thermoplastic material to said conical passages, the improvement wherein each of said die elements has its inner conical surface inclined at substantially the same acute angle with respect to said longitudinal axis of said mandrel and its outer conical surface inclined at an acute angle with respect to said longitudinal axis which is less than that of said inner conical surface; said angle of inclination of said inner conical surface being between about 20 and 80 degrees with respect to said longitudinal axis; and wherein each of said die elements has a helical groove within its outer conical surface, the depth of said helical groove decreasing as said groove approaches said annular thickness control passages.

14. An extrusion die apparatus for extruding a multiple layer tubular product comprising, in combination:

an elongated cylindrical mandrel having a forward and a rearward end;

a plurality of annular die elements of unitary structure mounted co-axially one behind the other on said mandrel and forming contiguous annular thickness control passages between said die elements and said mandrel, said die elements including inner and outer conical surfaces inclined rearwardly along the longitudinal axis of said mandrel and forming acute angles therewith, said die elements being nested together with said outer conical surfaces facing said inner conical surfaces and forming conical passages therebetween communicating with said annular thickness control passages;

said annular die elements each including an outer cylindrical portion located behind said outer conical surface, said outer cylindrical portion having a larger diameter than said outer conical surface forming substantially flat annular forward and rearward surfaces extending radially outward from said outer conical surface, said die elements being stacked one behind the other in said nested assembly of said die elements with said substantially flat annular forward surface of one die element mating with said substantially flat annular rearward surface of an adjacent die element, said die elements each having the inner conical surface thereof inclined at substantially the same acute angle with respect to said longitudinal axis of said mandrel and being straight and smooth, said angle of inclination of said inner conical surface being between about 20 and 80 degrees with respect to said longitudinal axis;

said die elements each having the outer conical surface thereof inclined at an acute angle with respect to said longitudinal axis which is less than that of said inner conical surface;

said die elements each having a helical groove within the outer conical surface thereof, the depth of said helical groove decreasing as said groove approaches said annular thickness control passages, a base having a forward end and an outer conical surface which is inclined rearwardly from said forward end of said base at a predetermined angle with respect to said longitudinal axis of said base, said base supporting said mandrel at said forward end thereof with its outer conical surface facing said inner conical surface of an adjacent die element forming a conical passage therebetween which communicates with said annular thickness control passages, said base having a helical groove within said outer conical surface of said base;

a circular inner lip attached to said forward end of said mandrel;

an annular outer lip supported by said mandrel within said inner lip forming therebetween an annular extrusion orifice, said extrusion orifice communicating with said annular thickness control passages;

an annular spacer member co-axially mounted around said mandrel between said annular outer lip and an adjacent annular die element, said spacer member having an inner conical surface which is inclined rearwardly at a predetermined angle with respect to said longitudinal axis of said mandrel, said inner conical surface of said spacer member being straight and smooth and facing said outer conical surface of an adjacent die element forming a conical passage therebetween which communicates with said thickness control passages: and means for delivering a molten thermoplastic material to said conical passages including an inlet port located within said cylindrical portion of each of said die elements and at least one channel communicating between said inlet port and said helical groove on said outer conical surface of said die elements wherein said material is substantially uniformly distributed over said conical surfaces of said die elements, entering said annular thickness control passages to form overlapping tubular layers, said overlapping tubular layers being extruded from the die in the form of a multiple layer tube.

15. An extrusion die apparatus according to claim 14, wherein said base includes an outer cylindrical portion located behind said outer conical surface of said base, said outer cylindrical portion of said base having a larger diameter than said outer conical surface of said base forming a substantially flat annular surface extending radially outward from said outer conical surface of said base, said substantially flat annular surface of said base mating with said substantially flat annular rearward surface of an adjacent die element and forming a seat for said nested assembly of die elements.

16. An extrusion die apparatus according to claim 15, wherein said spacer member includes an outer cylindrical portion having a larger diameter than said inner conical surface of said spacer member forming a substantially flat annular surface extending radially outward from said inner conical surface of said spacer member, said substantially flat, annular surface of said spacer member mating with said substantially flat annular forward surface of an adjacent die element and forming another seat for said nested assembly of die elements.

17. An extrusion die apparatus according to claim 16, wherein a plurality of bolt means extends through said outer cylindrical portion of said die elements and secure said die elements between said base and said spacer member, said bolt means being staggered apart from one another so as to clear said inlet ports and said channels in each of said die elements.

* * * * *